(12) United States Patent
Nomoto et al.

(10) Patent No.: US 10,452,047 B2
(45) Date of Patent: Oct. 22, 2019

(54) MOBILE ASSIST DEVICE AND MOBILE ASSIST METHOD

(71) Applicants: Qingdao Hisense Electronics Co., Ltd., Qingdao OT (CN); TOSHIBA VISUAL SOLUTIONS CORPORATION, Misawa-shi, Aomori OT (JP)

(72) Inventors: Hiroyuki Nomoto, Sayama Saitama (JP); Shun Hirao, Ome Tokyo (JP); Hidehito Izawa, Hanno Saitama (JP); Reiko Kawachi, Nishitama Tokyo (JP); Kunio Honsawa, Ome Tokyo (JP)

(73) Assignees: QINGDAO HISENSE ELECTRONICS CO., LTD., Qingdao (CN); Toshiba Visual Solutions Corporation, Misawa-Shi (JP)

(*) Notice: Subject to any disclaimer, the term of this patent is extended or adjusted under 35 U.S.C. 154(b) by 250 days.

(21) Appl. No.: 15/445,862

(22) Filed: Feb. 28, 2017

(65) Prior Publication Data
US 2018/0101154 A1 Apr. 12, 2018

(30) Foreign Application Priority Data
Oct. 12, 2016 (JP) .................. 2016-200994

(51) Int. Cl.
G05B 19/048 (2006.01)
G01J 1/42 (2006.01)
(Continued)

(52) U.S. Cl.
CPC .......... *G05B 19/048* (2013.01); *G01J 1/4204* (2013.01); *G05D 1/0246* (2013.01); *G05D 1/0255* (2013.01); *G08B 13/196* (2013.01); *H04L 12/2816* (2013.01); *H04N 5/2351* (2013.01); *H04N 5/2354* (2013.01); *H04N 5/23222* (2013.01); *H04N 7/185* (2013.01);
(Continued)

(58) Field of Classification Search
None
See application file for complete search history.

(56) References Cited

U.S. PATENT DOCUMENTS 6,590,222 B1 7/2003 Bisset et al.
2002/0184630 A1 12/2002 Nishizawa et al.
(Continued)

FOREIGN PATENT DOCUMENTS

EP 2637073 A2 9/2013
EP 2839769 A2 2/2015
(Continued)

*Primary Examiner* — Kenneth M Lo
*Assistant Examiner* — Istiaque Ahmed
(74) *Attorney, Agent, or Firm* — Hauptman Ham, LLP

(57) ABSTRACT

According to one embodiment described herein aim to provide a mobile assist device capable of comprehensively determining (or judging) data output from various sensors, thereby determining (or judging) an item which should be controlled next. The mobile assist device includes a movable body, a sensors mounted on the movable body, and a control module which determines the brightness of the surroundings from an output of the sensor, and also outputs a control signal for controlling the operation of the other instrument based on a result of the determination.

5 Claims, 23 Drawing Sheets

(51) Int. Cl.
  *H04N 5/232* (2006.01)
  *H04N 5/235* (2006.01)
  *H04N 7/18* (2006.01)
  *H05B 37/02* (2006.01)
  *G05D 1/02* (2006.01)
  *G08B 13/196* (2006.01)
  *H04L 12/28* (2006.01)
  *A47L 9/28* (2006.01)

(52) U.S. Cl.
  CPC ........ *H05B 37/0227* (2013.01); *A47L 9/2852* (2013.01); *G05B 2219/24015* (2013.01); *G05B 2219/2651* (2013.01); *G05B 2219/37433* (2013.01); *G05D 1/0274* (2013.01)

(56) References Cited

U.S. PATENT DOCUMENTS

| | | |
|---|---|---|
| 2004/0088080 A1 | 5/2004 | Song et al. |
| 2004/0205825 A1 | 10/2004 | Kawabe et al. |
| 2005/0052338 A1 | 3/2005 | Suzuki et al. |
| 2005/0096790 A1 | 5/2005 | Tamura et al. |
| 2005/0159841 A1 | 7/2005 | Yasukawa et al. |
| 2005/0179785 A1 | 8/2005 | Shingu et al. |
| 2006/0187313 A1* | 8/2006 | Pandit ............... H04N 5/23212 348/222.1 |
| 2007/0226363 A1 | 9/2007 | Nishizawa et al. |
| 2007/0272831 A1* | 11/2007 | Dailey ............... H05B 37/0218 250/214 AL |
| 2008/0010336 A1 | 1/2008 | Nishizawa et al. |
| 2009/0028387 A1 | 1/2009 | Jeong et al. |
| 2012/0140093 A1* | 6/2012 | Chuang ............... H04N 5/2256 348/234 |
| 2012/0313779 A1* | 12/2012 | Papaefstathiou .... G05D 1/0038 340/540 |
| 2014/0207282 A1* | 7/2014 | Angle ............... H04L 12/282 700/257 |
| 2014/0239817 A1* | 8/2014 | Leinen ............... H05B 37/02 315/152 |
| 2016/0167234 A1 | 6/2016 | Angle et al. |

FOREIGN PATENT DOCUMENTS

| | | |
|---|---|---|
| JP | H7-334243 A | 12/1995 |
| JP | 2002-330230 A | 11/2002 |
| JP | 2002-344654 A | 11/2002 |
| JP | 2003-037834 A | 2/2003 |
| JP | 2003-087758 A | 3/2003 |
| JP | 2003-339038 A | 11/2003 |
| JP | 2004-295408 A | 10/2004 |
| JP | 2005-103678 A | 4/2005 |
| JP | 2005-236428 A | 9/2005 |
| JP | 2007-133625 A | 5/2007 |
| JP | 2007-133736 A | 5/2007 |
| JP | 2007-249898 A | 9/2007 |
| JP | 2007-336035 A | 12/2007 |
| JP | 4245367 A | 1/2009 |
| JP | 2006-252569 A | 9/2009 |
| JP | 2010-011017 A | 1/2010 |
| JP | 4819221 A | 9/2011 |
| JP | 2016-072931 A | 5/2016 |
| JP | 2017-38894 A | 2/2017 |
| JP | 2017-131556 A | 8/2017 |

\* cited by examiner

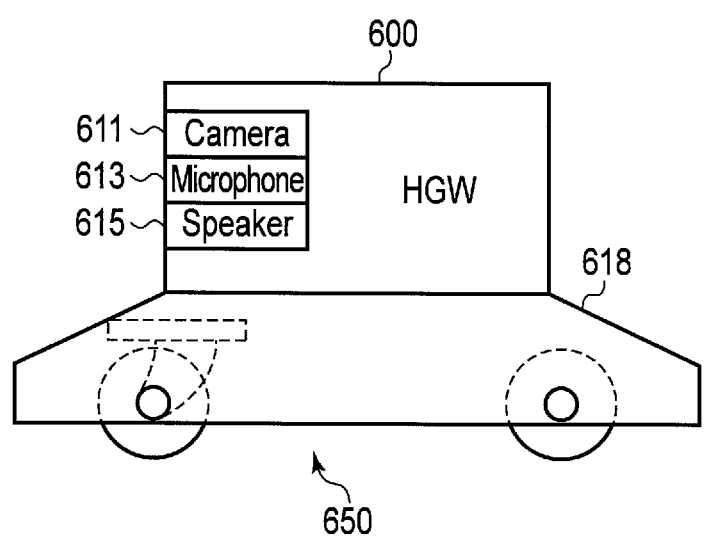
F I G. 1

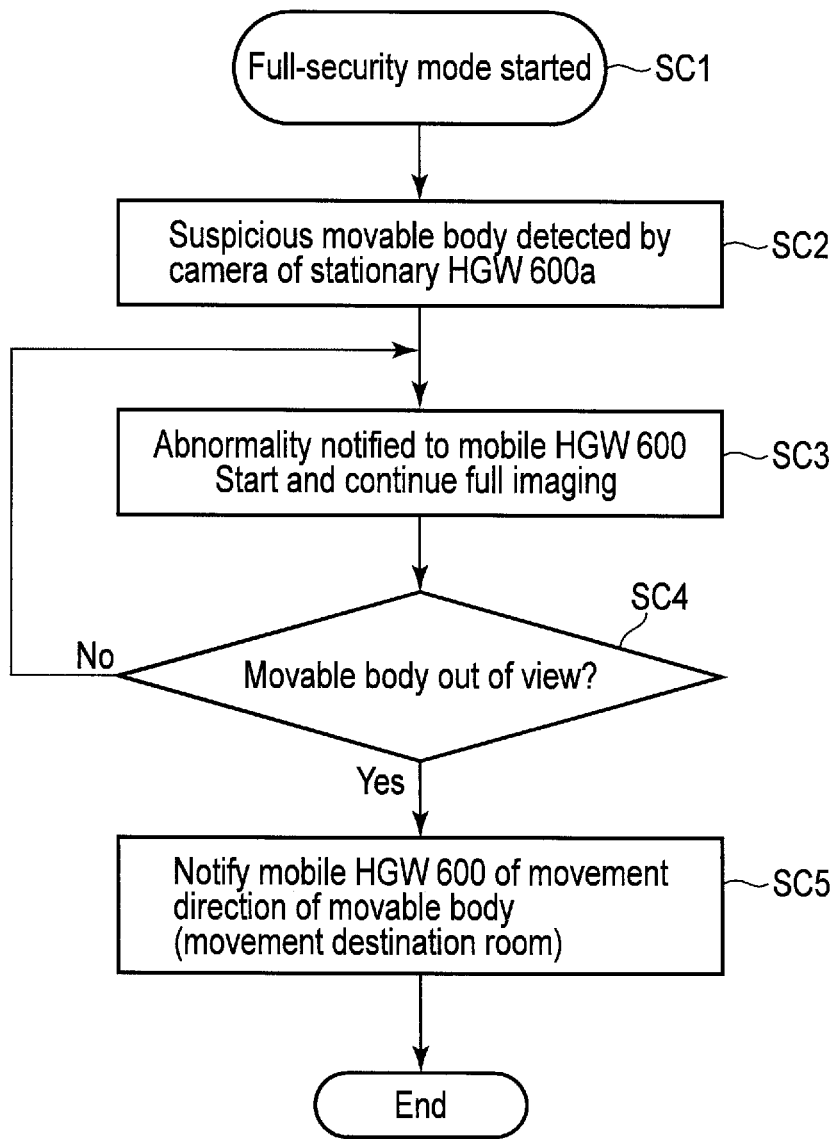
F I G. 7

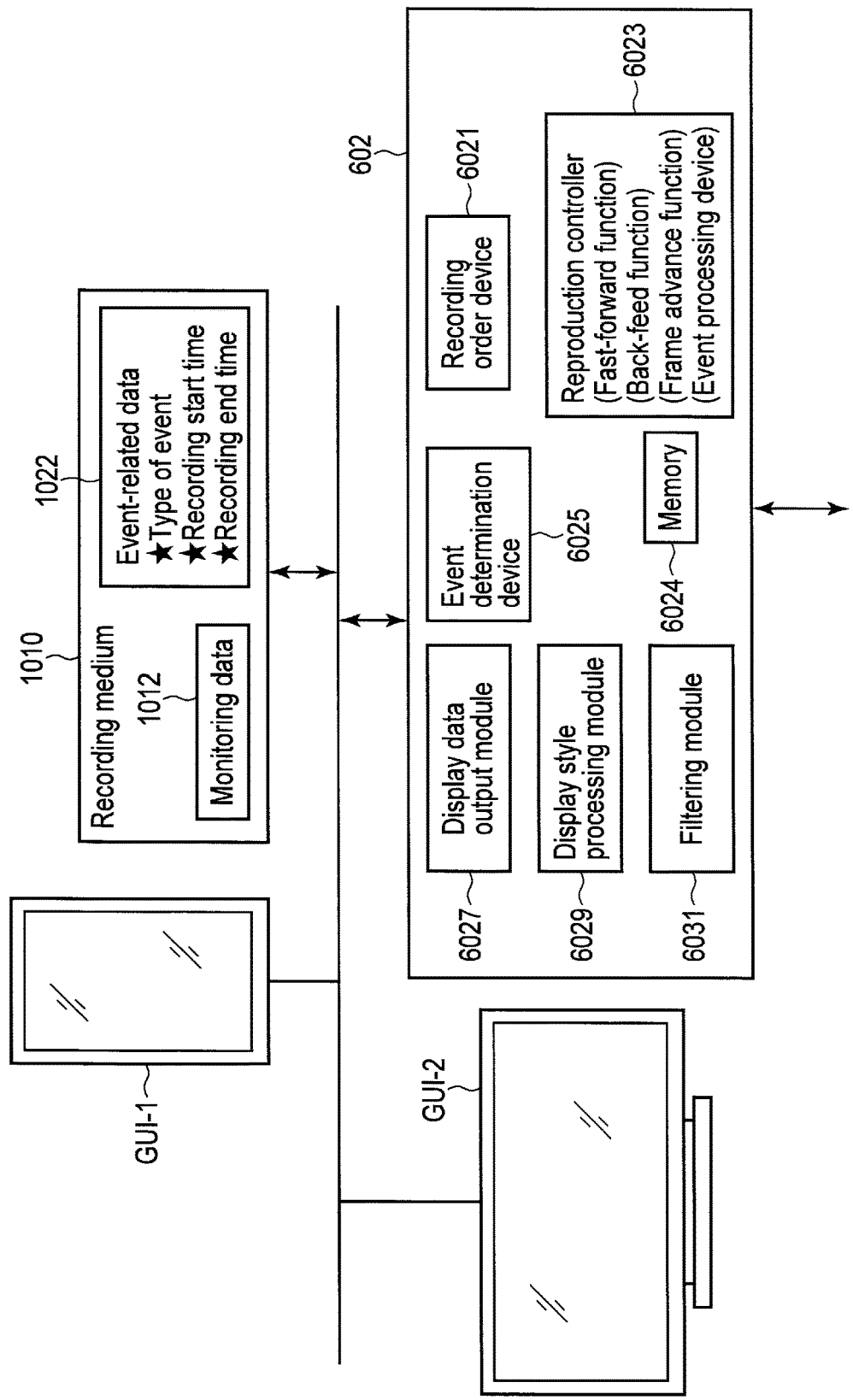
F I G. 13

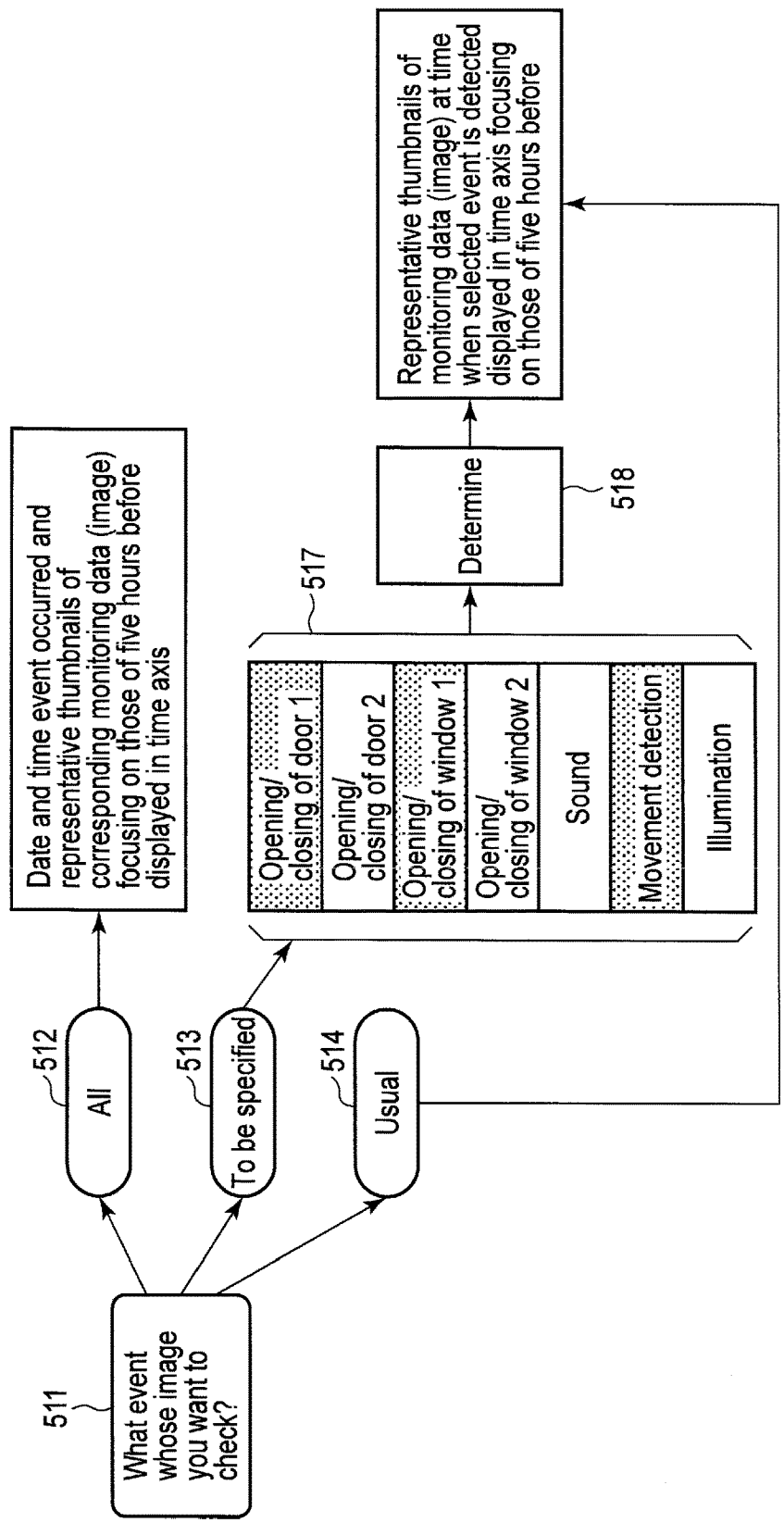
F I G. 15A

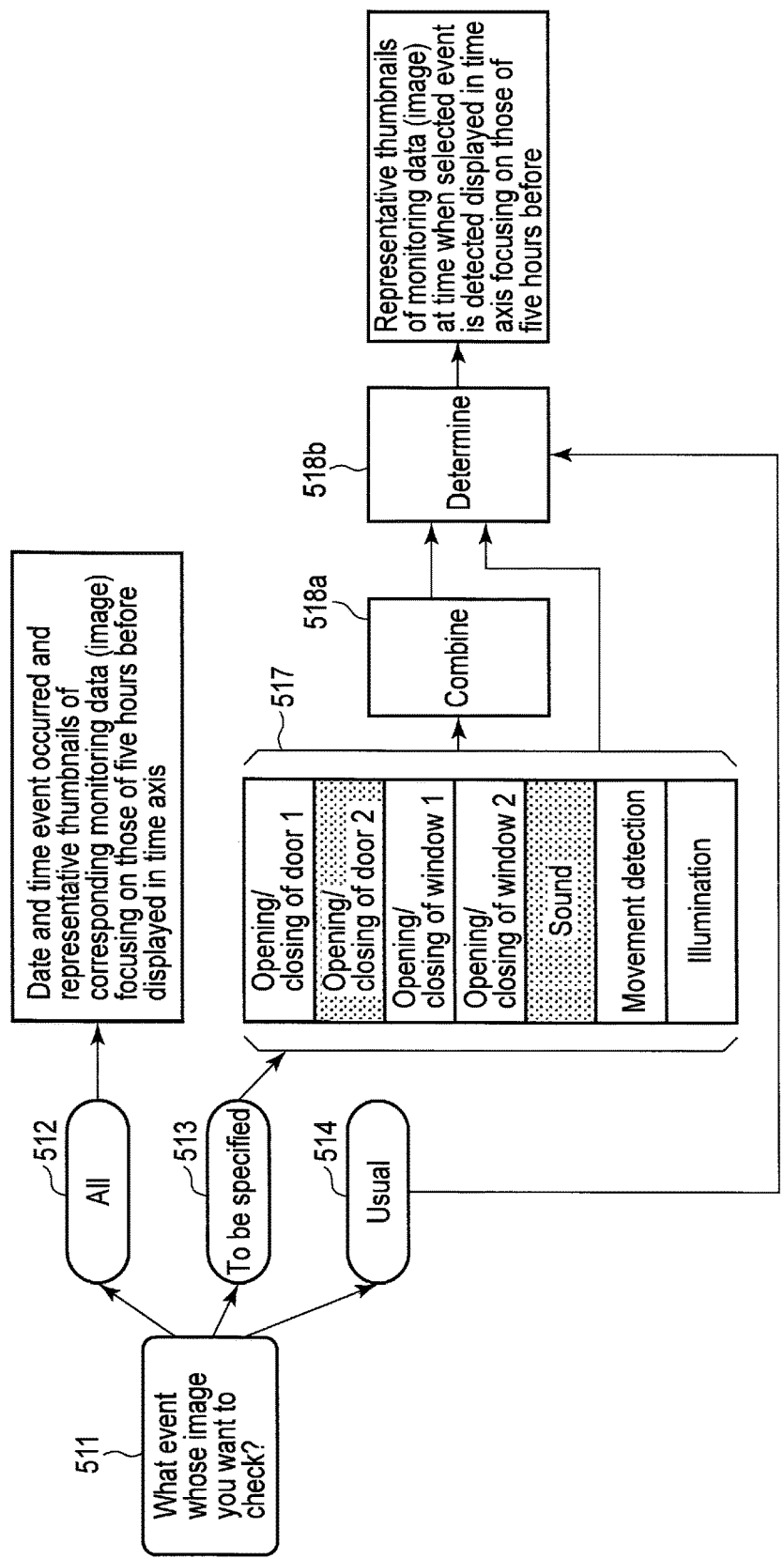
F I G. 15B

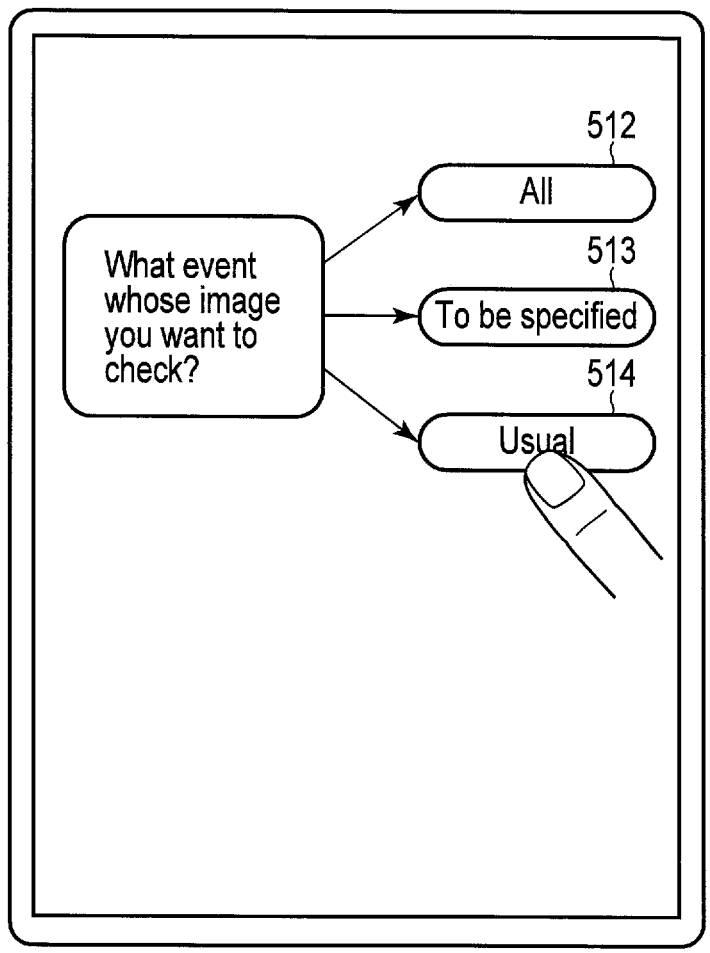
F I G. 16A

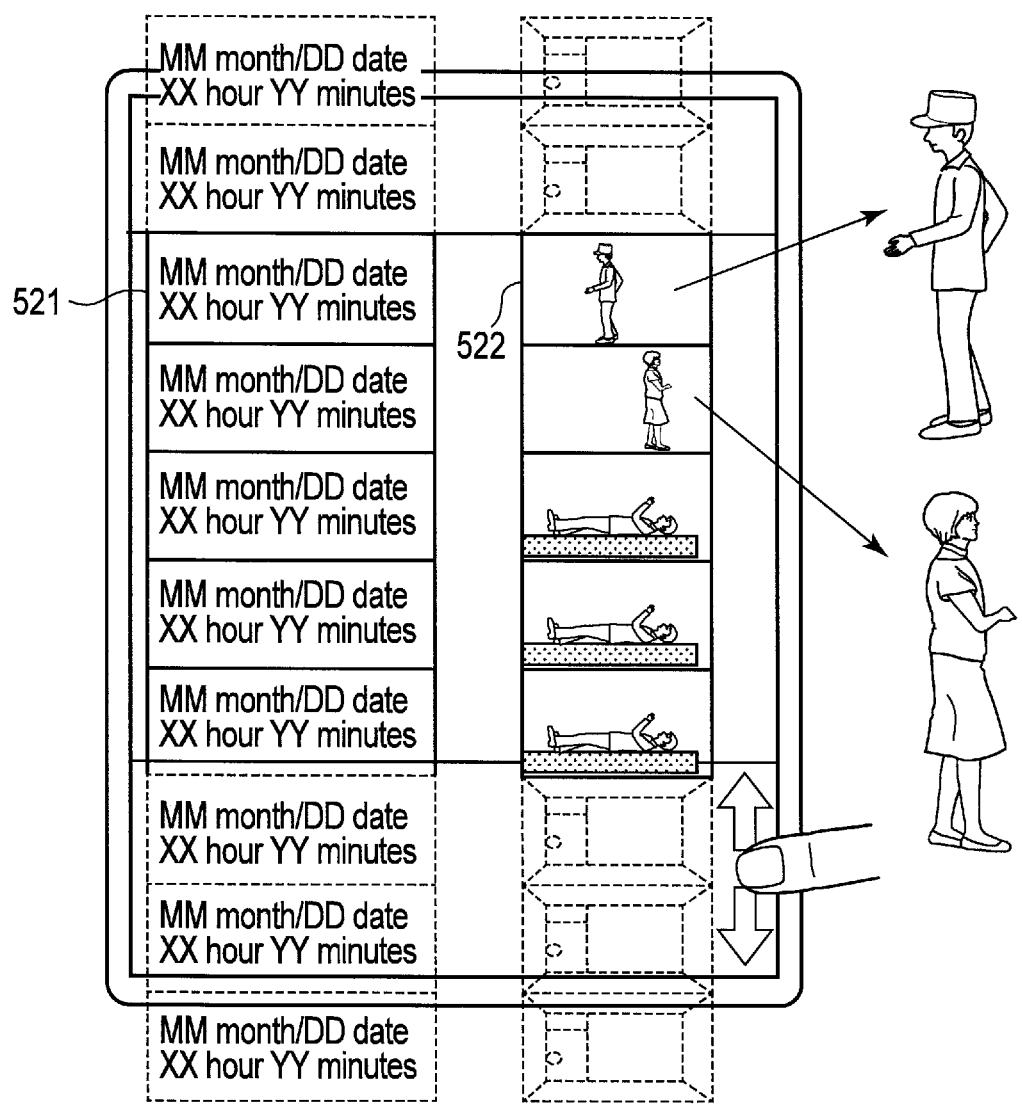
F I G. 16B

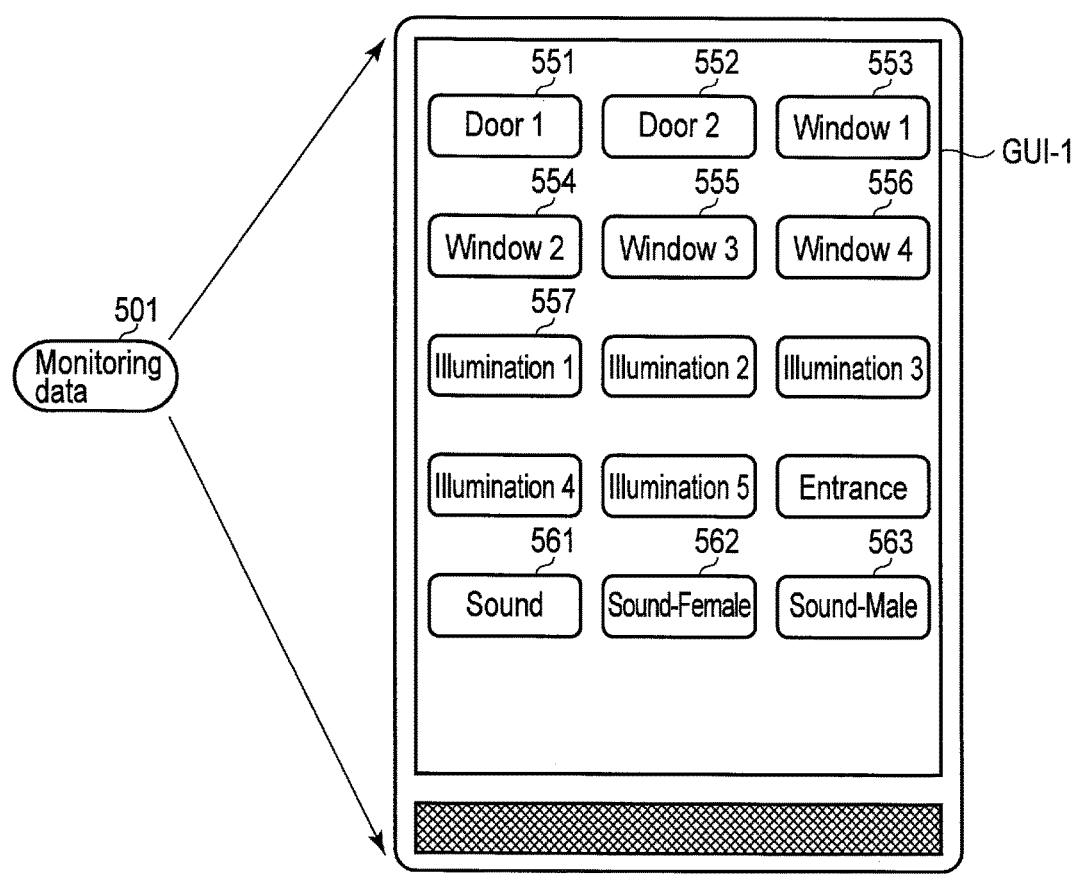
F I G. 19

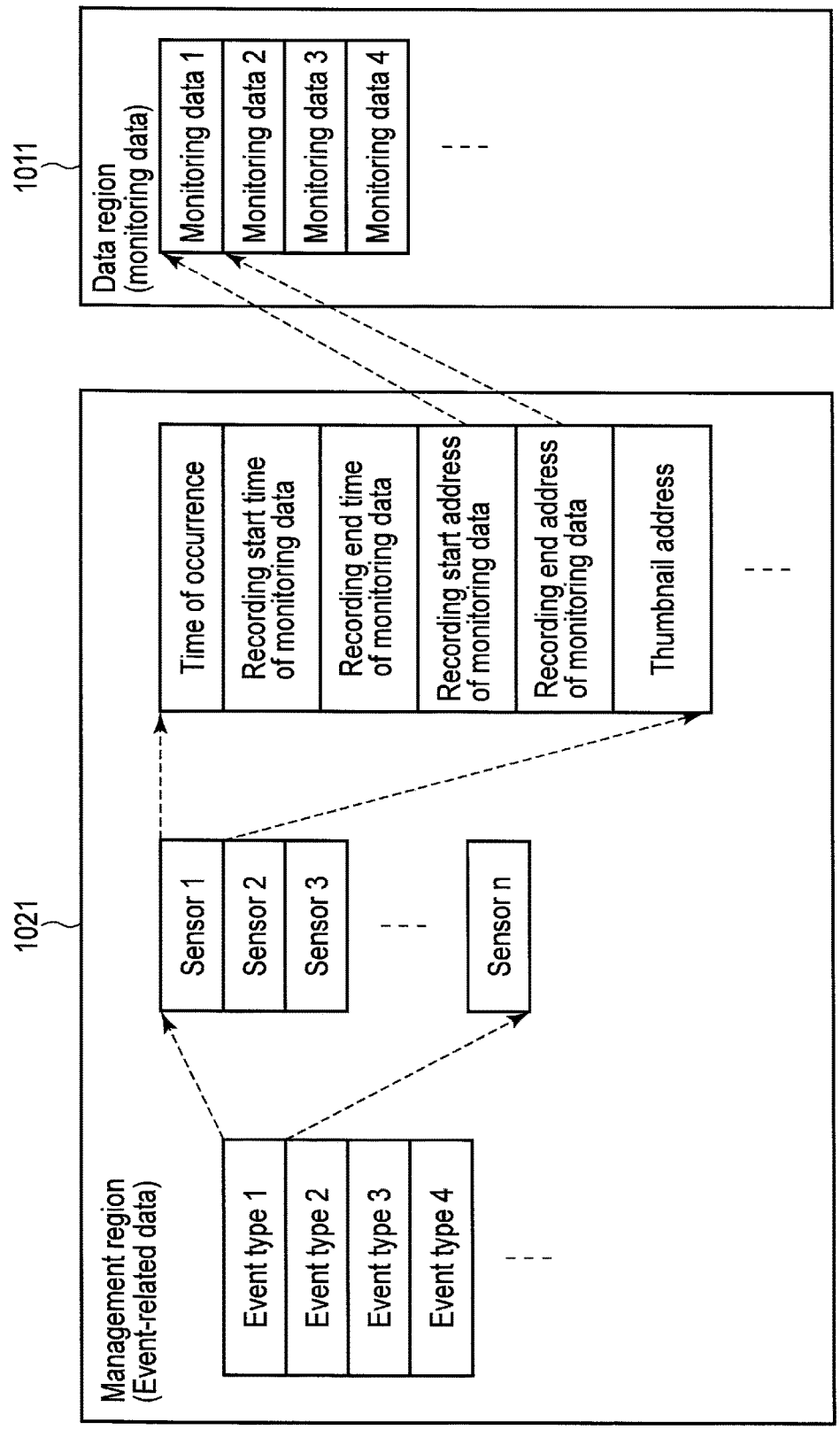
F I G. 20

MOBILE ASSIST DEVICE AND MOBILE ASSIST METHOD

CROSS-REFERENCE TO RELATED APPLICATIONS

This application is based upon and claims the benefit of priority from Japanese Patent Application No. 2016-200994, filed Oct. 12, 2016, the entire contents of which are incorporated herein by reference.

FIELD

Embodiments described herein relate generally to a mobile assist device and a mobile assist method.

BACKGROUND

Recently, various monitoring systems have been developed. For the monitoring system, a camera, a microphone, etc., are used, and video data and/or audio data is acquired and analyzed. In accordance with a result of analysis, various kinds of determinations such as a break-in by a suspicious person are made.

And also, apart from monitoring cameras and microphones, various sensors have been developed. Not only sensors such as a temperature sensor, a gas sensor, and a pressure sensor, but sensors having a small data processor, a memory, and a communication function (including ones which may be referred to as IoT [Internet of Things]) have also been developed. Accordingly, as a monitoring system, an up-to-date monitoring system which uses output of various sensors as an information acquisition source, and carries out a comprehensive situation determination is desired.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an illustration showing an outline of a mobile assist device.

FIG. 3A is an illustration showing a case where a mobile type HGW 600 entered a bright room 800a.

FIG. 7 is a flowchart showing a system operation example when a full-security mode is set in a system to which the present embodiment is applied.

FIG. 13 is a block configuration example showing the essential parts in the embodiment of FIG. 11.

FIG. 15A is an explanatory diagram showing steps for accessing the monitoring data via a smartphone.

FIG. 15B is an explanatory diagram showing the other steps for accessing the monitoring data via a smartphone.

FIG. 16A is an illustration showing an example of an operation screen displayed on the smartphone.

FIG. 16B is an illustration showing another example of an operation screen displayed on the smartphone.

FIG. 19 is an illustration for describing an example of yet another relationship between a smartphone and event-related data displayed on the smartphone, and yet another operation method.

FIG. 20 is a hierarchy figure for describing an example of the relationship between a recorded position of event-related data and a recorded position of monitoring data.

DETAILED DESCRIPTION

Figure 2:
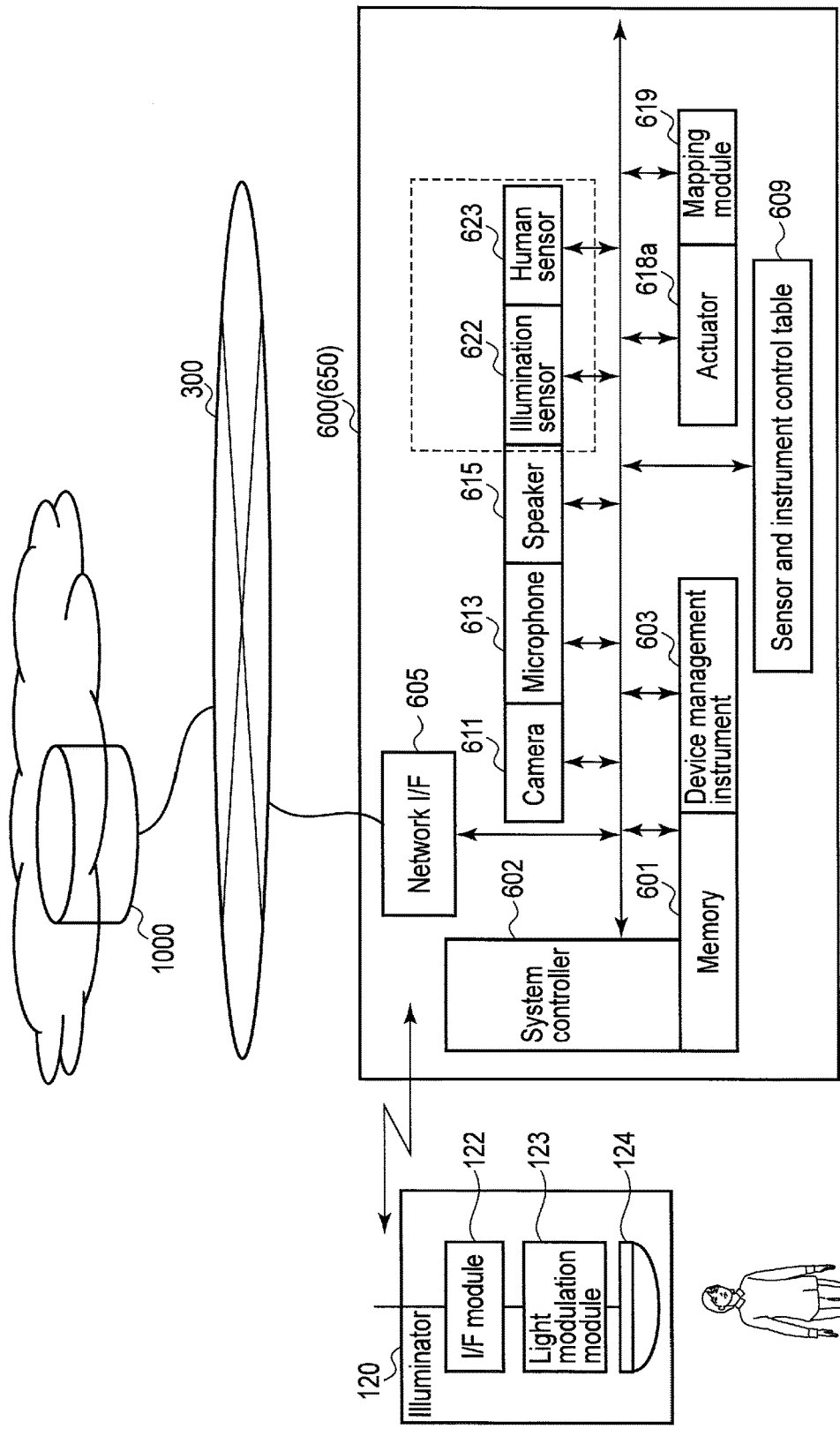
FIG. 2 is a diagram showing the relationship between an internal structure of an HGW 600 and a network.

Various embodiments will be described hereinafter with referring to the accompanying drawings.

In general, according to one embodiment described herein aim to provide a mobile assist device capable of comprehensively determining (or judging) data output from various sensors, thereby determining (or judging) an item which should be controlled next, and improving the monitoring effect.

Also, in another embodiment, an object is to provide a mobile assist device and a mobile assist method capable of realizing cooperation of a plurality of monitor sensors, and further improving the assist function.

According to one embodiment, the mobile assist device includes a movable body, a sensor mounted on the movable body, and a control module which determines the brightness of the surroundings from an output of the sensor, and also outputs a control signal for controlling the operation of the other instrument based on a result of the determination.

With reference to FIG. 1, an outline of a mobile assist device will be further described. 600 denotes a home gateway (which will be indicated as HGW), and this element can be connected to a network as described later. The HGW 600 is a mobile device which is integrated with a movable device (also referred to as a carrying device) 618. Note that the HGW 600 may be a stationary type (also referred to as a fixed type), and can be collectively called an assist device 650 including the mobile type.

The HGW 600 (assist device 650) includes at least a camera 611, a microphone 613, and a speaker 615. The camera 611 and the microphone 613 may be called a sensor in a broad sense. A plurality of cameras may be provided. The HGW 600 can control the movable device 618 based on pick-up data from the sensor, and an internal control application. Based on this self-control, a change of a location, pursuit of an object, and the like can be carried out.

FIG. 2 shows the relationship between an internal structure of the HGW 600 and a network.

A server 1000 can be connected to the HGW 600 via the Internet 300. The HGW 600 comprises a memory 601, a control module (also referred to as a system controller) 602, a device management instrument 603, a network interface (also referred to as a network I/F) 605, a sensor control table 609, the camera 611, the microphone 613, the speaker 615, etc.

The HGW 600 is compatible with various communication modes via the network I/F 605 having a communication function (also referred to as a communication device). The sensors may have different communication modes depending on makers. For example, there may be a sensor which adopts IEEE 802.15.4 as the communication mode, a sensor which adopts IEEE 802.151, or a sensor which adopts IEEE 802.15.3a. Further, there may be sensors which adopt IEEE 802.11b, IEEE 802.11a, and IEEE 802.11g.

Hence, the HGW 600 of the present embodiment can be equipped with an interface compatible with various modes as a network interface.

Further, the HGW 600 comprises an actuator 618a which drives and controls the aforementioned movable device 618. Furthermore, the HGW 600 comprises a mapping module 619 capable of storing places where the HGW 600 moved and creating a map.

The HGW 600 also comprises an illumination sensor 622 which detects the brightness of the surroundings, and a human sensor 623 capable of sensing whether or not there is a person in the surroundings. Note that when the surrounding illumination is sufficient, the camera 611 may also serves as the human sensor 623.

The memory 601 (also referred to as a control data management module) includes an application manager (hereinafter referred to as APP-Mg), an event manager (hereinafter referred to as EVT-Mg), and a configuration manager (hereinafter referred to as CONFIG-Mg). APP-Mg manages a plurality of applications for controlling various operations of the HGW 600. EVT-Mg manages an application for an event, for example, for controlling various operations which result from occurrences of various events. Further, CONF-Mg recognizes the functions within the HGW 600 and various functions associated with the HGW 600, and manages a configuration application which determines the order of operation and restricts the operation, for example.

The system controller 602 can exercise control over respective blocks in the HGW 600 and perform sequence control. Further, the operations or the like of the HGW 600 (determination, data processing, analysis operation, communication), which will be described later by referring to a flowchart, is executed based on the applications stored in the system controller 602 and the memory 601.

EVT-Mg can control the camera 611, the microphone 613, the speaker 615, a recording management device (not shown), etc. Further, EVT-Mg can determine detection data from an external sensor captured from the network I/F 605 and/or data from the camera 611 and the microphone 613, and control the next action or behavior. CONFIG-Mg can perform the settings such as the initial setting of each function block in the HGW 600, restriction of the function, broadening of the function, priority, and operation time.

The device management instrument 603 can authenticate the other apparatuses which operate in association with the HGW 600, and register such apparatuses in the memory 601. Accordingly the device management instrument 603 can manage a plurality of other sensors, an illuminator 120, etc., which are connected via the network I/F 605. Further, the device management instrument 603 registers identification data of the server 1000 which is connected via the Internet 300, and can recognize the server 1000. Furthermore, the device management instrument 603 registers identification data of a smartphone, etc., which is connected via the Internet 300, and can recognize the smartphone.

Further, the sensor and instrument control table 609 stores the names of various sensors and instruments, position information on various sensors and instruments, and data for controlling the respective sensors and instruments and/or restricting the control. Also, the names and position information of the respective sensors can be displayed on the smartphone, etc., whereby the user can confirm the type and the arrangement position of the sensor.

The network I/F 605 is connected to the other sensors inside a house or a target to be controlled (the illuminator 120, etc.) via a short-range wireless communication. In the drawing, the illuminator 120 is illustrated as a representative example. The illuminator 120 comprises an I/F module 122 connectable with the network, a light modulation module 123, and a luminescent module 124. The light modulation module 123 can control a current of the luminescent module 124 based on an order given from the outside via the I/F module 122, and by this control, the illumination can be controlled to be brighter or darker. Apart from the above, various sensors exist as a sensor for acquiring information, a sensor for control, and a sensor to be controlled.

Here, the mapping module 619 capable of storing the places of movement and creating a map will be further described. The mapping module 619 can utilize an image from the camera 611 that is mounted, for example. As the mapping function of the mapping module 619, a simultaneous localization and mapping (SLAM) function, which is the function of simultaneously estimating the self-position and creating the environmental map, is provided. In contrast to a conventional movable body which merely runs randomly on a floor, this SLAM function creates a map of a target area, and operates while constructing an operation (movement) path in accordance with the created map. The SLAM function can refer to imaging data from the camera, create the surrounding environmental map internally, and output the current position information.

<Illumination Control and Image Capturing>

Figure 3A:
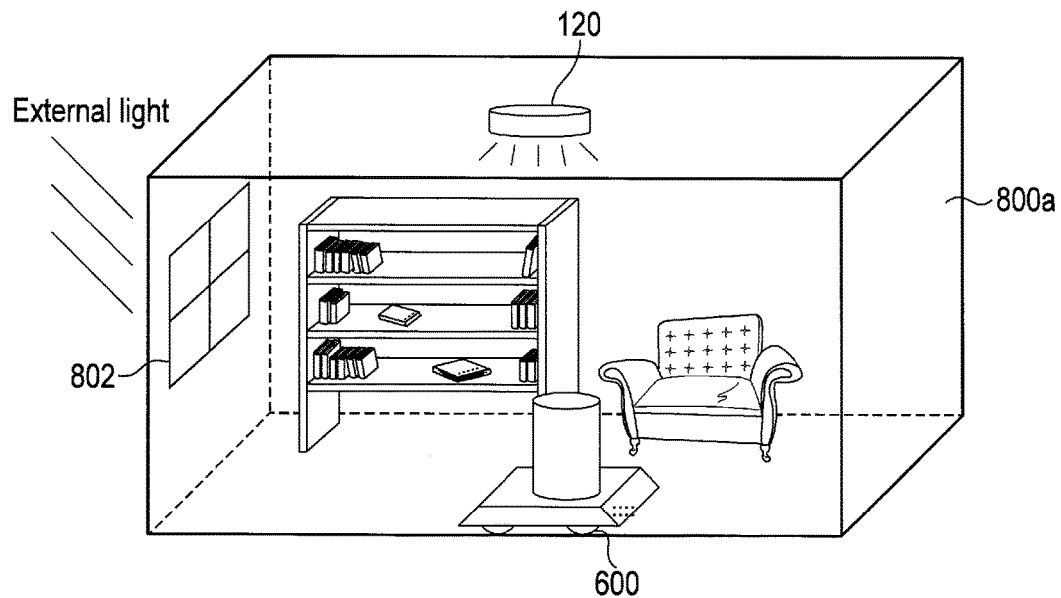
Figure 3B:
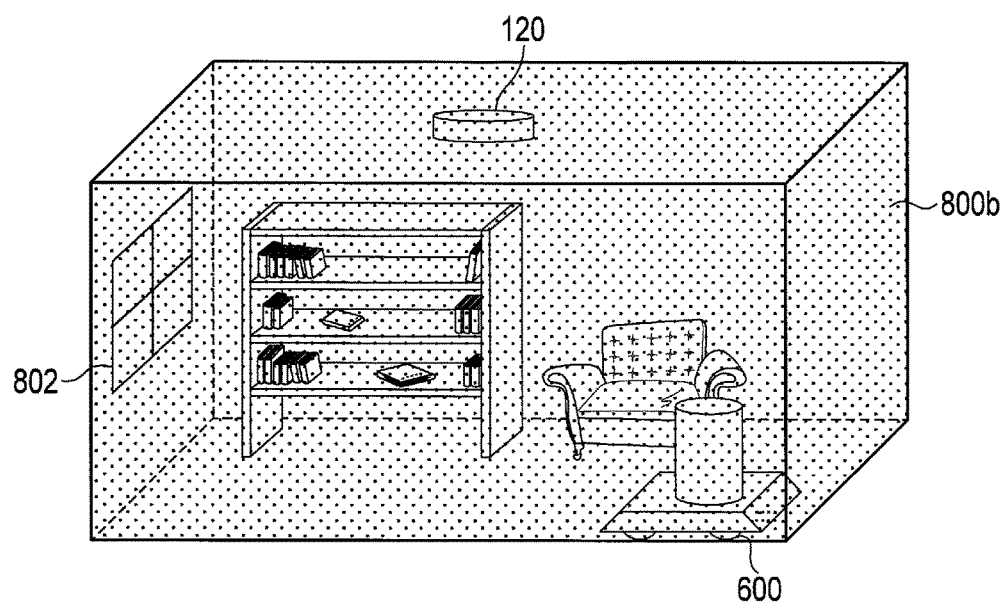
FIG. 3B is an illustration showing a case where the mobile type HGW 600 entered a dark room 800b.

FIGS. 3A and 3B show cases where the above mobile HGW 600 entered a room 800a which is bright, and a room 800b which is dark, respectively. The HGW 600 checks a measured value of the illumination sensor 622 when the HGW 600 entered the room 800a for capturing an image of the room for the purpose of a routine check, for example. Since the room 800a is bright, image capturing is performed. The condition that the room 800a is bright is that when the illuminator 120 is lit with sufficient brightness or when there is external light from a window 802 and the interior of the room is sufficiently bright.

In contrast, in a case where the HGW 600 entered the room 800*b* for capturing an image of the room for the purpose of a routine check, a measured value of the illumination sensor 622 shows that the illumination intensity is low. In this case, the HGW 600 controls the illuminator 120, makes the room brighter by lighting or modulation control, and captures the image.

The above explanation is an example, and corresponds to a simple case as the illumination control by the HGW 600. The HGW 600 can carry out more complicated control according to the environment.

Figure 4:
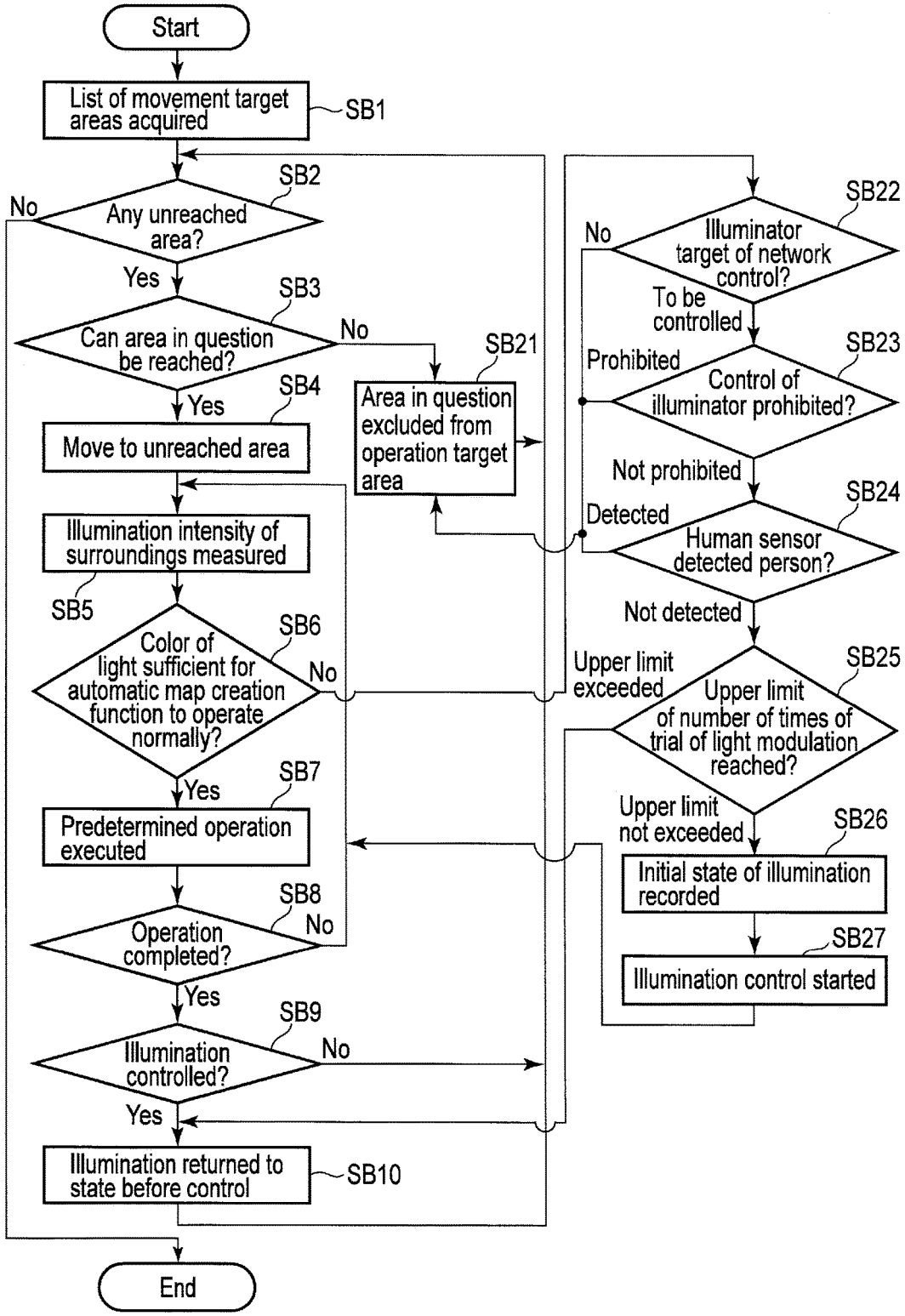
FIG. 4 is a flowchart an example of a control operation of the HGW 600.

Referring to FIG. 4, a further example of a control operation of the HGW 600 will be described. This control operation is performed in an integrated manner by the system controller 602 in the HGW 600.

The HGW 600 starts the operation based on, for example, an operation setting based on a timer set by the user, the user's direct operation, or some kind of detection information from the other sensors. The user's direct operation may be an operation order made by an instruction from the smartphone, for example, via the Internet. Alternatively, the operation may be started based on a specific voice order by the user. A movable body of the HGW 600 may start the movement based on an order from a stationary type assist device which will be described later. (This is a cooperative operation of the assist device.)

In an operation flow indicated here, it is assumed that a map of the room inside the house is already completed by the SLAM function executed in the past. Also, it is assumed that the HGW 600 is aware of the location of itself based on a combination of home map data, and the other sensors (camera, GPS, etc.).

Once the operation is started, a list of areas to which the HGW 600 is moved is acquired (step SB1). Next, it is determined whether there is an area not reached by the HGW 600. In this determining, the system controller 602 refers to the list of areas to which the HGW 600 is moved, and determines whether there is still an unreached area (step SB2). If there is no unreached area, the operation is finished, and if unreached areas remain, an unreached area of a high priority, for example, is determined. Next, the area determined as being an unreached area is determined whether it is an area that can be reached by the HGW 600 (step SB3).

In step SB3, when it is determined that the area is reachable, the process proceeds to step SB4. When it is determined that the area is not reachable, the process proceeds to step SB21. Materials for determining whether the area is unreachable are facts such as the room being locked by a sensor-equipped key, or existence of an unavoidable obstacle in the middle of a way as a result of a check by the camera.

When the HGW 600 has reached a reachable area (step SB4), the HGW 600 measures the illumination intensity of the surroundings (step SB5). Having measured the illumination intensity, it is determined whether the light of the surroundings is of the level which allows the SLAM function to be operated normally (step SB6).

When the brightness is of the level which allows the SLAM function to be operated normally, a predetermined operation is executed (step SB7). The predetermined operation is one corresponding to the purpose of the HGW 600 moving to this location.

For example, when the HGW 600 moved in order to measure the temperature of the room, the HGW 600 acquires temperature information from a temperature sensor of the room. Alternatively, when the HGW 600 moved in order to image a flower arranged in the room, the HGW 600 images the flower by using the camera 611. Furthermore, when the HGW 600 moved in order to monitor the open/closed state of a window of the room, the HGW 600 acquires opening/closing information from a window sensor of the room or images the window by using the camera. When such an operation is not completed, the process returns to step SB5. Note that when the HGW 600 determines that the flower does not have enough water, the HGW 600 controls an automatic waterer to be turned on, and can supply a predetermined amount of water to the flower. The HGW 600 can control the state of illumination also when the flower is to be imaged.

When the above operation is completed (step SB8), the HGW 600 determines whether the illumination was controlled before this operation was carried out (step SB9). When the illumination was controlled before execution of the operation, the HGW 600 performs control to set the illumination back to the state before the control (step SB10), and the process returns to step SB2.

In step SB3 described above, when it is determined that the HGW 600 cannot reach the unreached area, such an area is excluded from an operation (monitor) target area (step SB21), and the process returns to step SB2.

In step SB6 described above, it is assumed that the HGW 600 determined that the brightness of light of the surroundings is of an insufficient level, and thus the SLAM function cannot be operated normally. In this case, the process moves to step SB22, and it is determined whether the illuminator is a target of network control. Next, when the illuminator in question is the one of a target of network control, it is determined whether control of the illuminator is prohibited or not (step SB23). As reference data at this time, data in the device management instrument 603 and/or the sensor control table 609 (FIG. 2) is used.

When the illuminator is not a target of network control, or control is prohibited, in the step SB21, the area in question is excluded from movement target areas.

When control of the illuminator is not prohibited, it is further determined whether the human sensor 623 has detected a person or not. When the human sensor 623 has detected a person, except for a case where there is a specific operation purpose, basically, the area in question is excluded from the movement target areas (step SB21). The specific operation purpose needs to be achieved when the room is set as a target of monitor even if there is a person in the room. For example, when there is a person lying on a bed in a hospital, the open/closed state of a window or a curtain may be monitored. Hence, such a room is registered as an exceptional room (area) in advance. That is, as a checking mandatory area, such a room can be registered in the mapping module 619, for example.

In step SB24, when the human sensor has not detected a person, it is determined whether the number of times of trial of performing the light modulation has not reached an upper limit. Such determination is made to check whether the number of times of executing the light modulation has not exceeded a prescribed number of times of control by referring to the number of times of control of illumination carried out so far in the area at present. Further, the number of times of control of the illumination is restricted. The reason why the number of times of control of the illumination is restricted is that the most appropriate illumination environment for the SLAM function differs according to the area, and it may be necessary to try out the light modulation several times. However, in this trial process, when the light modulation cannot be performed well, a light modulation operation may fall into an infinite loop. Hence, in order to avoid the infinite loop, the number of times of execution of the light modulation is restricted.

If the number has not reached the upper limit, the initial state of the illumination is recorded (stored) (step SB26), and the control of the illumination is started (step SB27). However, if the number exceeds the upper limit, the process moves to step SB10.

As regards the control of illumination, full lighting, adjustment of color, etc., are possible. When the control of the illumination is started, the process moves to step SB5. In the above-described control loop, when the unreached area becomes nonexistent but for the excluded target area, the operation is finished. Further, for example, the HGW 600 automatically returns to a charging stand and starts the charge.

In the example described above, a case where the HGW 600 modulates the illuminator in accordance with the surrounding brightness environment has been explained. However, needless to say, the HGW 600 may be worked together with the image capturing by the camera 611, in addition to the modulation of the illuminator. Meanwhile, in step SB23, although it has been described that the light modulation is not performed when the human sensor has detected a person, the microphone 613 and/or the speaker 615 may be activated at this time.

Figure 5:
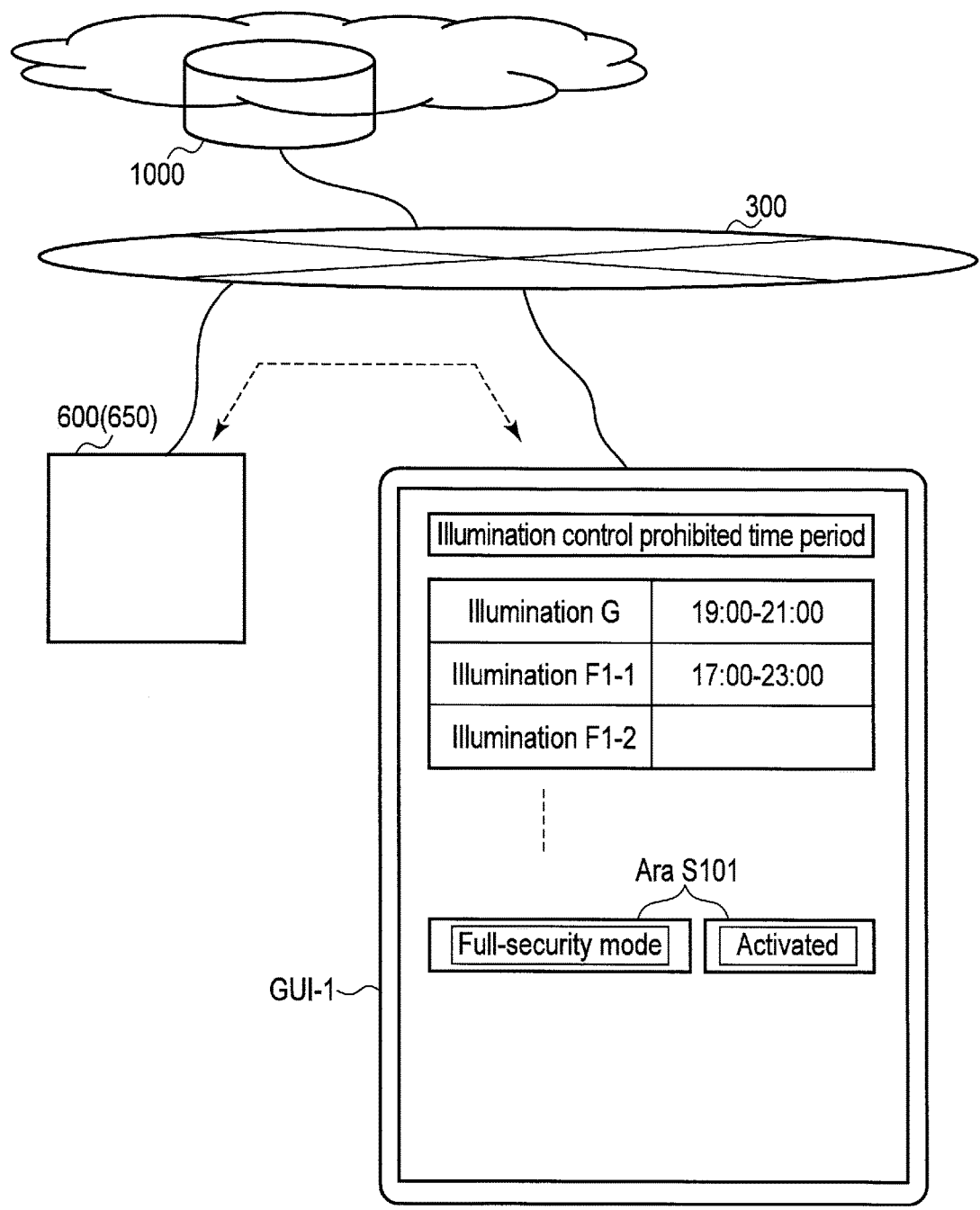
FIG. 5 is an illustration showing an example of the relationship between the HGW 600 and a smartphone.

FIG. 5 illustrates a case where the settings of the illumination control operation of the HGW 600 are performed by way of an external smartphone GUI-1. An HGW application of the smartphone GUI-1 can be started to access the HGW 600, and a list of the illuminators can be displayed. Further, a control prohibition time period can be set for each of the illuminators.

The example of FIG. 5 shows that control is prohibited from 19:00 to 21:00 with respect to illumination G (an illuminator at the entrance, for example). Various methods can be adopted as the method of inputting numerical values (in this case, a time). For example, a number selection method, or a method of inputting by selecting the numeric keypad displayed on the screen is available.

Illumination F1-1 (an illuminator in a living room on the first floor, for example) corresponds to an example in which the control is prohibited from 17:00 to 23:00.

The above describes examples in which prohibition of illumination control by the HGW 600 is set by the smartphone GUI-1. However, the other orders can also be sent to the HGW 600 from the smartphone GUI-1. In accordance with the order from the smartphone GUI-1, the HGW 600 can transmit an image captured at a moving destination area, for example, to the smartphone GUI-1. For example, a list showing the kinds of control performed in one day can also be transmitted to the smartphone GUI-1.

Furthermore, the above assist system can be set to a full-security mode. For example, there is a case where the owner of a house is away from home for some time (for example, one to two weeks), and no outsider is planned to be invited to the house. In such a case, the full-security mode can be selected from a menu screen of the smartphone GUI-1, and by operating a button area S101, the full-security mode can be set.

As described above, the present embodiment has the following features:

(A1) The present assist device includes a movable body, a sensor mounted on the movable body, and a control module which determines the brightness of the surroundings from an output of the sensor, and also outputs a control signal for controlling the operation of the other instrument based on a result of the determination.

(A2) In (A1), the present assist device further includes a mapping module which stores a plurality of areas, and the control module determines a moving destination area of the plurality of areas, and in the determined moving destination area, the illumination intensity is measured.

(A3) In (A1), the present assist device further includes a mapping module which stores a plurality of areas, and the control module determines a moving destination area of the plurality of areas, and in the determined moving destination area, the illumination intensity is measured. If a measured value of the illumination intensity is less than a predetermined value, the illumination intensity of the illuminator in the determined moving destination area is adjusted.

(A4) In (A3), the present assist device further includes a camera, and when the illumination intensity of the illuminator in the determined moving destination area is greatly adjusted, an image is captured by the camera.

(A5) In (A3), the control module includes a human sensor, and when the human sensor detects a person, adjustment of the illumination intensity of the illuminator is stopped.

(A6) In (A3), the control module includes a human sensor, and when the human sensor detects a person, adjustment of the illumination intensity of the illuminator is stopped, and a microphone or a speaker is activated.

(A7) In (A3), the present assist device includes a camera, and the mapping module which stores the plurality of areas, and when the measured value of the illumination intensity is less than the predetermined value, the control module temporarily stores the measured value of the illumination intensity. Further, when the illumination intensity of the illuminator in the determined moving destination area is greatly adjusted, an image is captured by the camera. Furthermore, after the image has been captured by the camera, the illuminator is adjusted so that the illumination reaches a level corresponding to the measured value which has been temporarily stored.

(A8) In (A7), the control unit also stores color of illumination before the illumination intensity of the illuminator is adjusted, and after the image has been captured by the camera, the color of the illumination of the illuminator is returned to that before the adjustment.

(A9) In (A3), the control unit does not control the illuminator in a time period when the control of the illumination intensity of the illuminator is prohibited.

(A10) In (A3), the control unit may control the illuminator to be flashed.

(A11) In (A3), when the movable body moved to the destination area based on an order from a stationary type assist device, the control module outputs a control signal for controlling the illumination.

<Cooperation of Sensor Information>

The above-described mobile assist device 650 can start an operation based on some kind of detection information from a first sensor. In this case, the first sensor can cooperate with second and third sensors.

Figure 6:
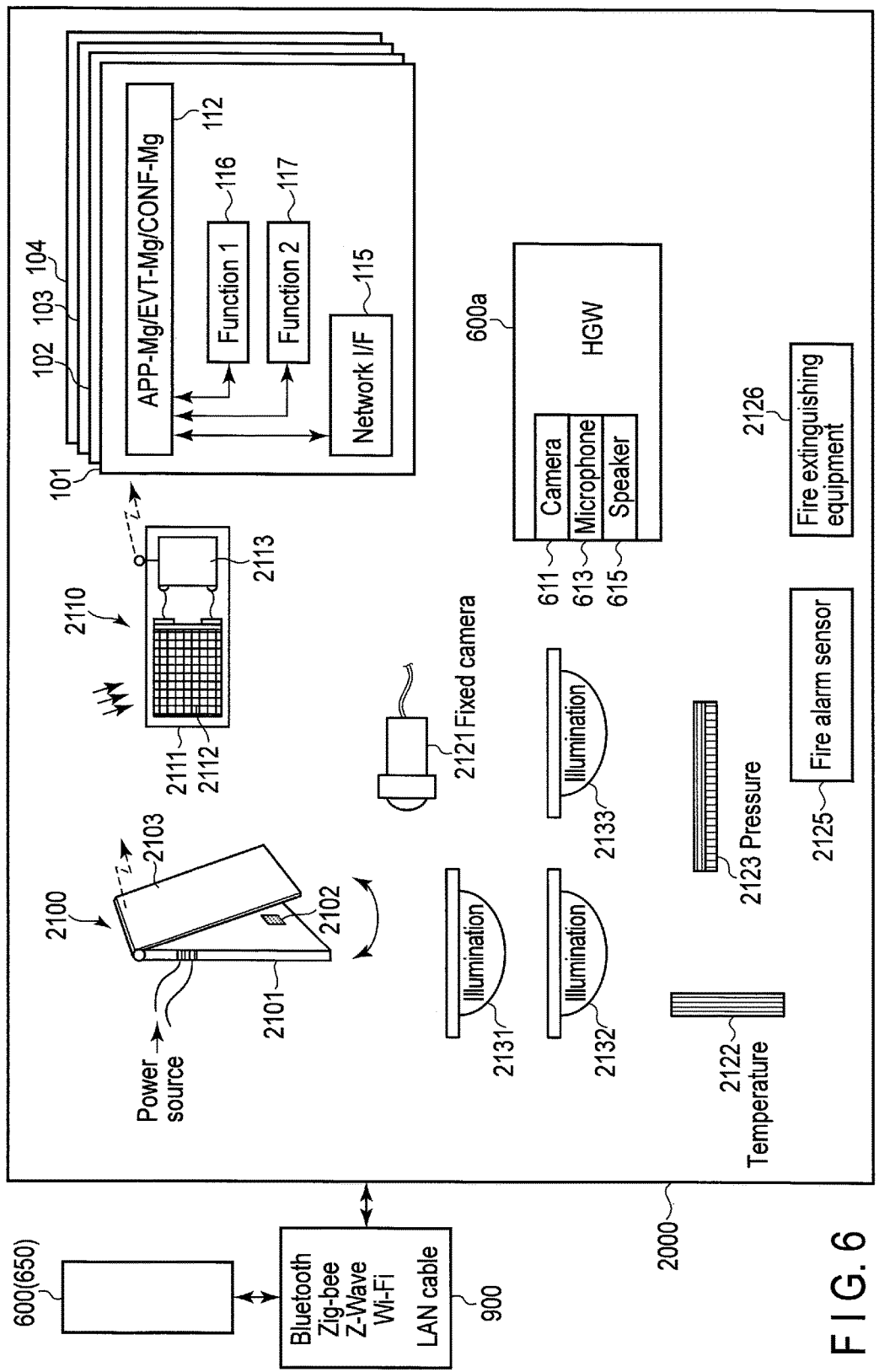
FIG. 6 is an explanatory diagram showing a schematic mutual relationship between a sensor group and devices to be controlled at home and the HGW 600.

FIG. 6 is an explanatory diagram showing a schematic mutual relationship between a sensor group and devices to be controlled (an illuminator, an air conditioner, a refrigerator, a television device, an iron, an automatic door, fire extinguishing equipment) at home and the HGW 600.

For example, when the air conditioner is controlled to lower the room temperature, the temperature may not be lowered soon. In such a case, the reason may not be the air conditioner, but that a window is open and from which the cool air is leaking outside. Alternatively, although the air conditioner is controlled to lower the room temperature, since a room temperature sensor is broken, the temperature cannot be adjusted accurately.

Embodiments which will be described below can provide a system which can cooperate with the other sensors, and prepare a favorable indoor environment when the above trouble occurs.

In FIG. 6, the HGW 600 can communicate with the sensor group and the devices to be controlled at home through a wire or wirelessly. As the communication mode, Bluetooth (registered trademark), ZigBee (registered trademark), Z-Wave (registered trademark), Wi-Fi (registered trademark), etc., are adopted.

2000 indicates a group of various sensors and a group of devices to be controlled. These may be referred to as a home network terminal group or Internet of Things (the so-called IoT element group). The respective sensors and devices to be controlled included in the IoT element group 2000 will now be described.

A sensor 2100 is an example of a sensor which detects an event. A switch 2102 is provided on a substrate 2101, for example. One end of a flap 2103 is arranged on one end of the substrate 2101 via a hinge. When a door or a window is opened, for example, the flap 2103 activates the switch 2102 as its rotation portion is separated from the substrate 2101. In this way, power from a power source is supplied to a power supply circuit structured in the substrate 2101, a radio wave transmitter of the substrate 2101 is activated, and a radio wave including a predetermined sensor ID is output. This means that the switch 2102 is activated (that is, the door or the window is opened), and the radio wave is received by the HGW 600, so that the HGW 600 can recognize that the door or window is open. When a radio wave including the predetermined sensor ID is not received, the HGW 600 can recognize that the door or the window is closed.

A sensor 2110 is an example of a sensor which detects another event. For example, a photoelectric converter (a photoelectric conversion panel) 2112 is arranged on a substrate 2111. An output of the photoelectric converter 2112 drives a radio wave transmitter 2113. The photoelectric converter 2112 is configured such that it discharges electricity and loses power immediately if no light is irradiated. Accordingly, for example, when a curtain is opened or light is irradiated by the illumination, a radio wave including a sensor ID is output from the radio wave transmitter 2113. Conversely, when the curtain is closed or the illumination is turned off, the radio wave transmitter 2113 is stopped, and radio wave output is stopped. Accordingly, the sensor 2110 can be used as a sensor which detects opening/closing of the curtain, or on/off of the illumination.

Further, the sensor may be structured such that a color filter is provided on a light receiving surface of the photoelectric converter 2112, so that it does not react to unnecessary light.

Note that in order to detect opening/closing of the curtain, apart from the sensor 2110, a second sensor similar to this sensor may be added. Further, the second sensor may be configured such that the switch is turned off due to blocking of light by the curtain when the curtain is opened, and turned on due to irradiation of light when the curtain is closed, and that a radio wave including an ID of the second sensor is output for a certain period of time. When the above structure is adopted, the HGW 600 can easily judge the abnormality when one of the sensors is out of order. Therefore, the HGW 600 system can enhance the detection capability of a curtain opening/closing detection function.

A sensor 101 is a high-level sensor structured by an integrated circuit. The sensor 101 includes a memory 112, and a network I/F 115. Also, the sensor 101 includes functions 116 and 117 as sensing elements. However, the type of sensor is not limited to the above, and various kinds of sensors can be used.

The memory 112 includes an application manager (APP-Mg), an event manager (EVT-Mg), and a configuration manager (CONFIG-Mg). CONFIG-Mg manages various applications for controlling an overall operation of the sensor system. EVT-Mg manages an event application for executing the next operation of the sensor 101 based on detection data from the functions 116 and 117. The functions 116 and 117 include various elements according to the purpose of sensing. Various elements may be, for example, a camera, and a microphone. Further, various elements include a thermal sensor, a temperature sensor, a humidity sensor, an illumination sensor, a pressure sensor, a switch, etc. The sensor 101 may comprise one or more sensing elements according to the purpose of use.

The above sensors 101, 102, 103, . . . , etc., can be used as a sensor for detecting opening/closing of the door, a sensor for detecting the type of the sound of a certain level, a sensor for detecting movement of a person, a sensor for detecting opening/closing of the window, and a sensor for capturing an image, and are arranged in various places at home, for example.

Although the HGW 600 has been described as a mobile type in the above, a stationary HGW 600a may further be additionally provided. In this case, the stationary HGW 600a is set as, for example, a slave HGW 600a. Because the HGW 600a includes a structure and a function similar to those of the HGW 600 described with reference to FIG. 2, except for the feature of the movable body, detailed explanation of the HGW 600a will not be given.

An element 2121 is a fixed camera provided at, for example, a car parking space, the entrance of a house, and a gate, and functions as a sensor. Illuminations 2131, 2132, and 2133, fire extinguishing equipment 2126, etc., are the devices to be controlled in each room at home. Also, a temperature sensor 2122 which is installed in a kitchen or a room temperature measurement spot, etc., a pressure sensor 2123 arranged on an edge of a window pane or a door, etc., a fire alarm sensor 2125, and a microphone (not shown) belong to the sensor group.

The above mobile HGW 600 and the stationary HGW 600a can achieve efficiency by combining the features of the above-described group of sensors and the group of devices to be controlled, and various kinds of capability that cannot be presented by a single sensor or a single device to be controlled can be exhibited.

FIG. 7 is a flowchart showing a system operation when a full-security mode is set. There is a case where the owner of a house is away from home for one to two weeks. A system according to the embodiment at this time can set the full-security mode.

Currently, it is assumed that the full-security mode is started (step SC1). Now, it is assumed that a suspicious movable body has been detected by a camera of the stationary HGW 600a (step SC2). In the HGW 600a, the camera is activated, and image capturing is started regularly or based on a sound or a detection signal from the human sensor, etc., for example. As the captured video data is processed by a movement detection circuit, the HGW 600a can detect a suspicious movable body. When the suspicious movable body is detected, the HGW 600a images a subject as an event. The imaging data is recorded in a recording medium (which may be, for example, a USB connection recording reproduction apparatus) connected to a network at home. Alternatively, the imaging data may be recorded in a recording medium in a server via the network.

When the HGW 600*a* has detected the suspicious movable body, this fact is notified to the mobile HGW 600 (step SC3). The HGW 600*a* continues imaging of the suspicious movable body, but the suspicious movable body may be out of the view (step SC4). That is, there are cases where the suspicious movable body moves to the other room or the entrance, etc. In such a case, the HGW 600*a* notifies the mobile HGW 600 of the fact that the suspicious movable body moved to the other room or the entrance (step SC5).

In this case, preferably, the HGW 600*a* should notify the mobile HGW 600 of the room that the suspicious movable body has moved to, on the basis of map information already registered.

The mobile HGW 600 can move to the room where the suspicious movable body has moved or the entrance by itself, image the suspicious movable body, and transmit video data for recording in the recording medium.

Figure 8:
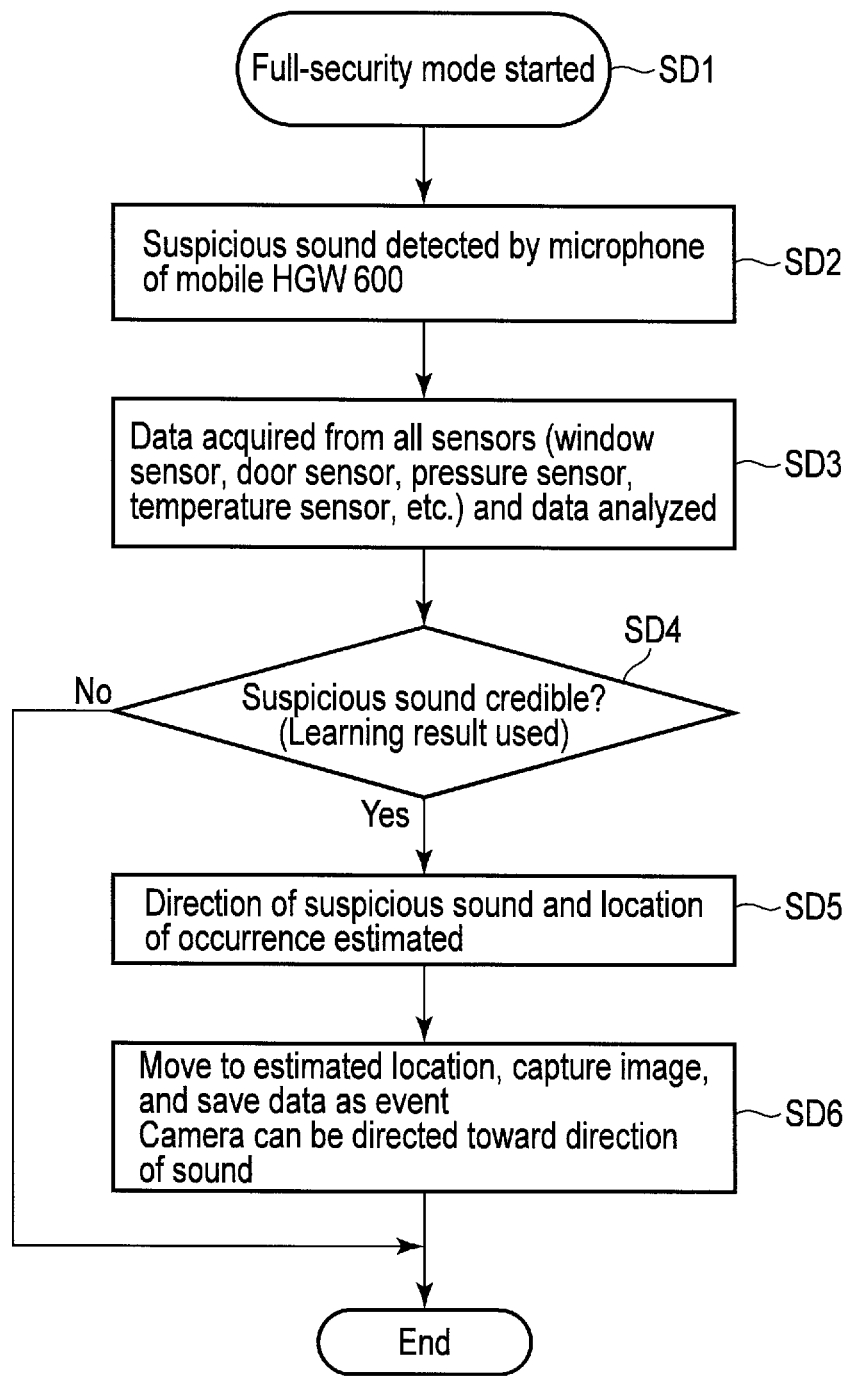
FIG. 8 is a flowchart showing another system operation example when a full-security mode is set in the system to which the present embodiment is applied.

FIG. 8 is a flowchart showing another system operation when a full-security mode is set. There is a case where the owner of a house is away from home for one to two weeks. A system according to the embodiment at this time can set the full-security mode.

For example, it is assumed that the mobile HGW 600 has detected a suspicious sound by the microphone (steps SD1 and SD2). Here, there are cases where the mobile HGW 600 cannot image a suspicious object which gives out the suspicious sound even if the surroundings are imaged by the camera.

Then, the mobile HGW 600 acquires data from sensors (the window sensor, a door sensor, the pressure sensor, the temperature sensor, etc.) installed at home such as in each room, and analyzes the data (step SD3).

The mobile HGW 600 determines whether the suspicious sound is credible, that is, whether the sound is not a typically heard sound (in other words, whether the sound is an abnormal sound) by analyzing the data. For this determination, a learning result of sounds detected in the past is also used. For example, in an area in which a vibration sound is heard because a train or a car always passes near the area, the learning result is used. Thus, even if a similar sound is detected, the mobile HGW 600 does not determine that the sound as being a suspicious sound. The abnormal sound includes, for example, a sound of tapping or breaking the window pane, a bumping sound, or a creaking sound.

Note that when a pet (dog, cat, bird, etc.) is at home, these sounds made by animals are analyzed based on an audio analysis, and can be excluded from abnormal sound determination.

When the credibility of the suspicious sound is high, the direction from which the suspicious sound has been made and the location where the sound was made are estimated (step SD5). Further, the mobile HGW 600 moves to an area in which the suspicious sound was made based on the map information, directs the camera toward the direction of the sound, and captures an image as an event (step SD6).

The mobile HGW 600 captures an image of a movement path by the camera while moving, and when there is an obstacle, the mobile HGW 600 can avoid the obstacle and keep on moving. The mobile HGW 600 has already registered the image of the movement path without obstacles in the mapping module 619. Accordingly, when there is an obstacle in a movement route, the mobile HGW 600 can immediately determine that the obstacle exists by image comparison.

When image capturing using the camera is to be performed as described above, the HGW 600 can light nearby illumination when the surroundings are dark, as already explained. Also, at this time, illumination intensity data regarding the illumination is acquired, and when the illumination intensity is insufficient, a manager can be notified of this as a caution.

Figure 9:
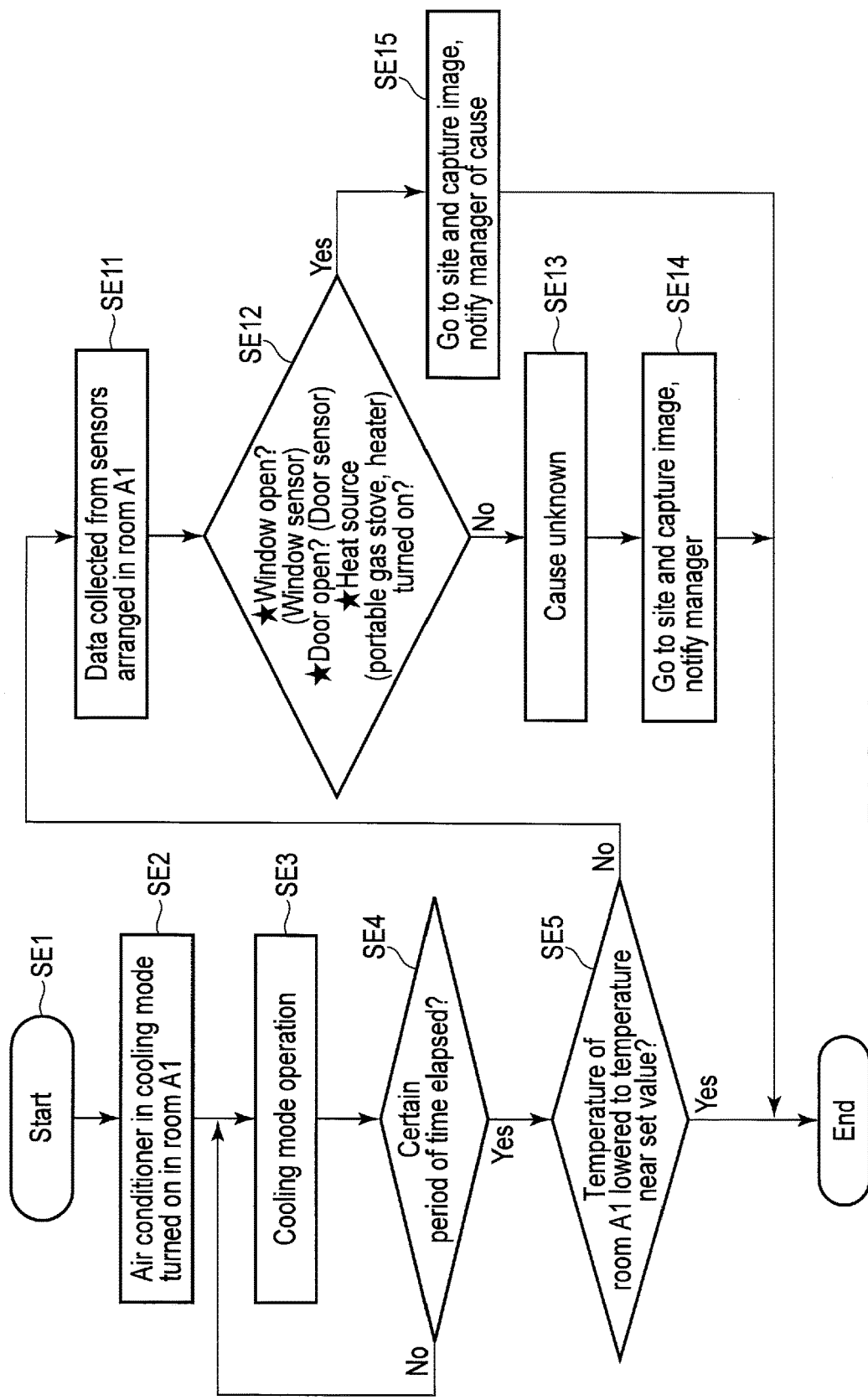
FIG. 9 is a flowchart showing a system operation example when the operation of an air conditioner is to be monitored in the system to which the present embodiment is applied.

FIG. 9 shows an embodiment of determining, after the mobile HGW 600 has controlled a device to be controlled (for example, an air conditioner) to be activated, whether the air conditioner is functioning normally. It is assumed that the mobile HGW 600 has turned on the air conditioner in a cooling mode in room A1 through, for example, remote control or the user's voice order (steps SE1 and SE2). When the air conditioner starts the cooling operation and a certain period of time elapses (SE3 and SE4), it is checked whether the temperature of room A1 has been lowered to a temperature near a set value (step SE5). The mobile HGW 600 can store the temperature of room A1 when the air conditioner in a cooling mode is started, and compare the temperature at this time and the temperature of room A1 after a lapse of the certain period of time.

Here, if the temperature of room A1 is within a desired temperature range, the process is finished (step SE6). However, if the temperature of room A1 is not lowered to a level that is within a predetermined range, data is collected from various sensors installed in room A1.

The data is collected from sensors such as the window sensor, the door sensor, and a sensor of a heat source (a portable gas stove, a heater, etc.). Here, if the window is open, the door is open, or the heat source is turned on, it is highly probable that they are causing the temperature of room A1 not to be lowered. Hence, the mobile HGW 600 goes to a site, captures an image, and notifies the manager (step SE15).

Also, after the data from the sensors has been analyzed, even if the cause is unknown, the mobile HGW 600 goes to the site, captures an image, and notifies the manager (step SE14).

In the above embodiment, even if the cooling mode of the air conditioner is switched to a heater mode, by a similar process, a normal operation or an abnormal state of the air conditioner in the heater mode can be determined.

Figure 10:
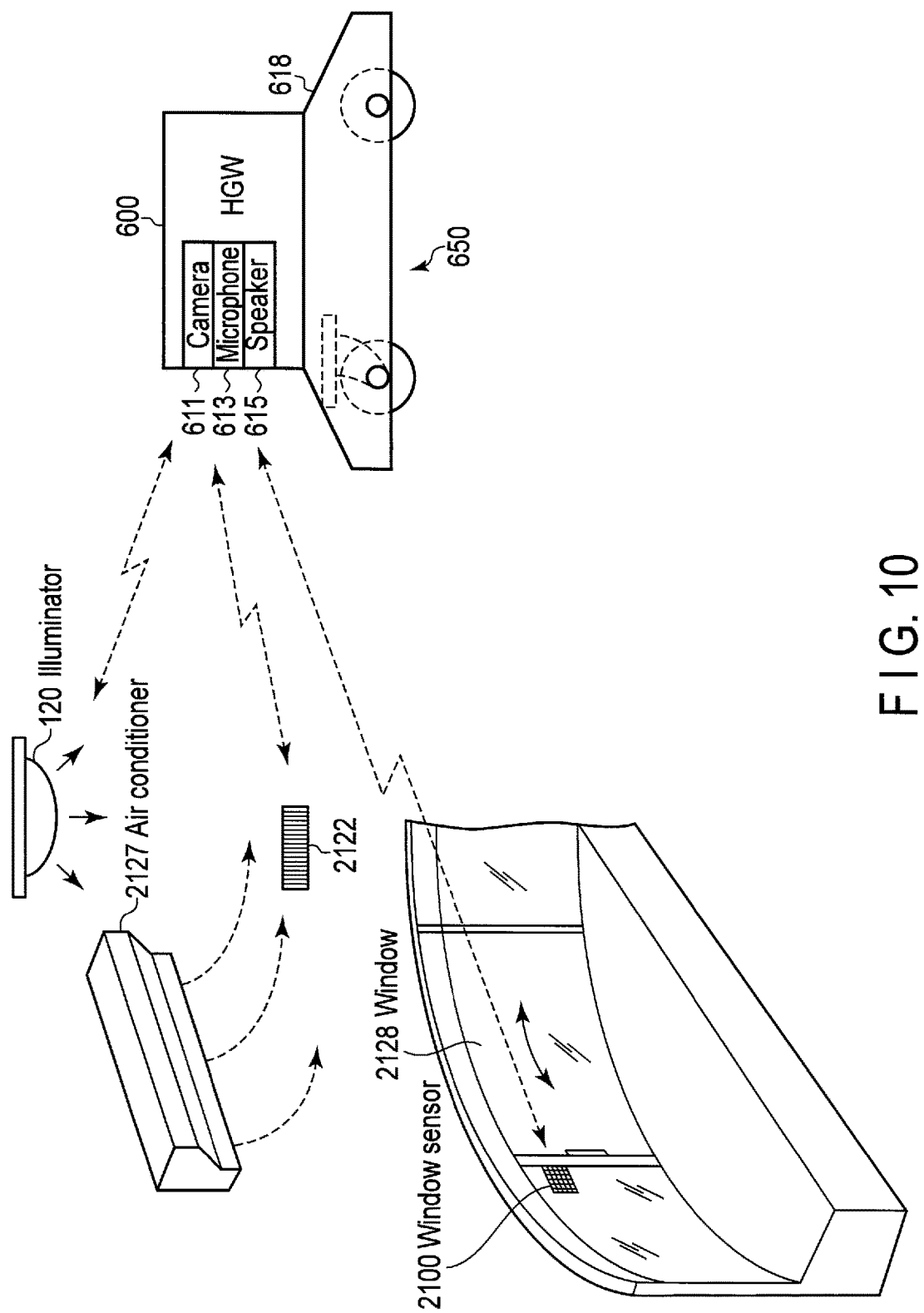
FIG. 10 is a reference drawing for explaining the operation when an inspection of a sensor and a device to be controlled is carried out in the system to which the present embodiment is applied.

FIG. 10 is an explanatory diagram for explaining yet another embodiment of the mobile HGW 600 described above. The present mobile HGW 600 includes various sensors installed at home, and a function of checking the normal/abnormal state of each of the devices to be controlled regularly or based on the user's order.

For example, the illuminator 120 is controlled to be turned on and off, and the output from the camera 611 and/or the illumination sensor is checked. In this way, whether the illuminator 120 is operating normally can be determined. Also, it is possible to control a plurality of illuminators to be turned on and off separately, and check whether the camera 611 and/or the illumination sensor is (are) operating normally. When the plurality of illuminators are controlled to be turned on and off separately, and neither of the camera 611 and the illumination sensor reacts, it is possible that the camera 611 and/or the illumination sensor is out of order.

Also, by controlling the illuminator, measuring the illumination intensity of the illuminator, and comparing the illumination intensity with the past measurement data, replacement timing of the illuminator can be determined. Further, since the illuminator may be of the type that an illumination sensor is incorporated in the illuminator, output data from this illumination sensor may be adopted by the HGW 600.

Moreover, the HGW 600 can control an air conditioner 2127 to be turned on and off, and determine whether the air conditioner 2127 is operating normally based on detection data from the temperature sensor 2122. When the air conditioner is operating normally, when detection outputs from a plurality of temperature sensors are acquired and analyzed, it also becomes possible to determine whether any one of the temperature sensors is out of order.

Moreover, the open/closed state of a window 2128 can be captured by the camera 611, and whether the window 2128 is open can be determined from image data. At this time, by determining whether a window sensor 2100 is turned on or off, it is also possible to determine whether the window sensor 2100 is operating normally or not.

As can be seen, logical consistency between the controlled state of the device to be controlled and the detection output of the sensor can be checked.

As described above, the HGW 600 of the present embodiment can carry out an inspection of various sensors and various devices to be controlled. The main functions are summarized as follows:

(1B) The HGW 600 comprises a movable device in which a camera, a microphone, a communication device, and a control device are mounted, and the control device comprises: means for acquiring sound data of a sound detected by the microphone; means for estimating a direction of the sound and an area in which the sound was produced; and means for causing the camera to capture an image in the direction of the sound by controlling the movable device so that the movable device moves to the area in which the sound was produced.

(2B) In (1B), the HGW 600 comprises means for restricting the estimation, the control of the movable device, and the image capturing depending on the type of the sound.

(3B) In (1B), the HGW 600 comprises learning means regarding the sound, and is permitted to comprise means for restricting the estimation, the control of the movable device, and the image capturing when the sound is one stored in the learning means.

(4B) In (1B), the HGW 600 comprises means for controlling the movable device, and turning on illumination in a movement route when brightness is insufficient for image capturing while the movable device is moving.

(5B) In (1B), the HGW 600 comprises means for controlling the movable device, and capturing an image of a movement route while moving. The means for controlling the movable device is configured to determine the presence or absence of an obstacle from a difference between past imaging data and imaging data captured during the move, and avoid the obstacle.

(6B) In (4B), the HGW 600 can measure the illumination intensity of the illumination, and give a warning when the brightness of the illumination is insufficient.

(7B) In (1B), the HGW 600 comprises means for controlling a first device to be controlled, means for acquiring a detection output of a first sensor which reacts to a phenomenon based on the first device to be controlled, and means for checking logical consistency between the controlled state of the first device to be controlled and the detection output of the first sensor.

(8B) In (7B), the first device to be controlled is an illuminator, and the first sensor is an illumination sensor.

(9B) In (7B), the number of devices to be controlled corresponding to the first device to be controlled is one, and the number of sensors corresponding to the first sensor is more than one.

(10B) In (7B), the number of devices to be controlled corresponding to the first device to be controlled is one, the number of sensors corresponding to the first sensor is more than one, the first sensors are turned on at different times, and the HGW 600 comprises means for determining whether one of the first sensors is out of order.

<Recording of Events and Check Function of Events>

The present embodiment is not limited to the above.

Figure 11:
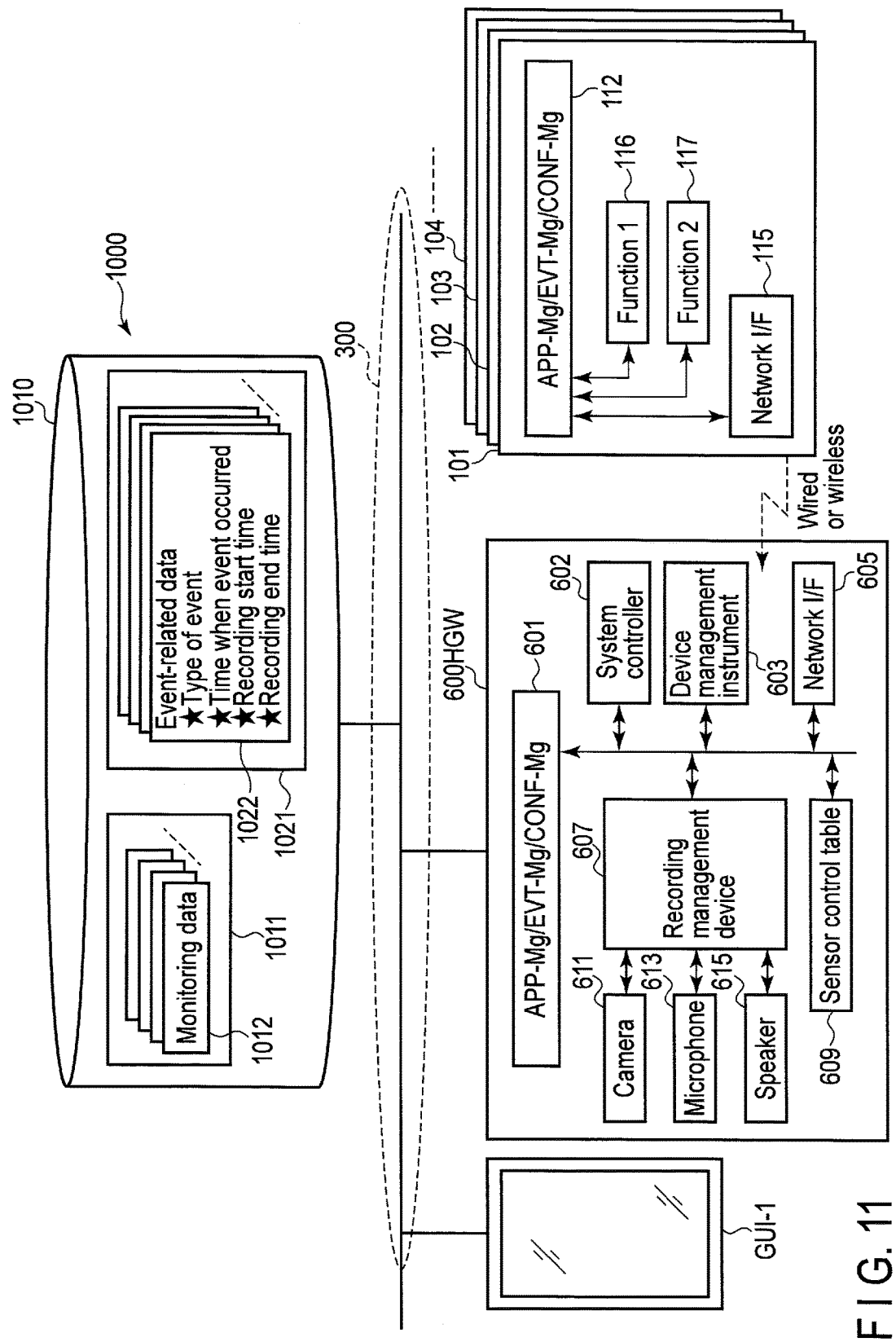
FIG. 11 is a diagram showing the entire configuration example of another network system to which the present embodiment is applied.

FIG. 11 is an illustration showing the entire configuration example of a network system in which a mobile assist device, which is one of the embodiments, is used.

In FIG. 11, the server 1000 can be connected to the home gateway (hereinafter referred to as the HGW) 600 via the Internet 300. The HGW 600 comprises the system controller 602, the device management instrument 603, the network interface (hereinafter referred to as the network I/F) 605, a recording management device 607, the camera 611, the microphone 613, the speaker 615, etc. Also, the HGW 600 includes a sensor control table 609.

The memory (control data management module) 601 is as described above. The system controller 602 can exercise control over respective blocks in the HGW 600 and perform sequence control.

The EVT-Mg can further control the recording management device 607.

Also, the sensor control table 609 stores the names of the respective sensors that are registered, i.e., the sensors 101, 102, 103, and 104, the position information on the respective sensors, and data for controlling the respective sensors. Further, the names and position information of the respective sensors can be displayed on the smartphone GUI-1, whereby the user can confirm the type and the arrangement position of the sensor.

The network I/F 605 is connected to the other sensors 101, 102, 103, . . . , etc., inside a house, for example, via a short-range wireless communication. The structure of the other sensor 101 is shown as an representative example. The sensor 101 of this case includes a control data management module 112 and the network I/F 115. Also, the sensor 101 includes the functions 116 and 117 as sensing elements. However, the type of sensor is not limited to the above, and various kinds of sensors can be used.

The memory (control data management module) 112 includes the application manager (APP-Mg), the event manager (EVT-Mg), and the configuration manager (CONFIG-Mg). CONFIG-Mg manages various applications for controlling an overall operation of the sensor system. EVT-Mg manages an event application for executing the next operation of the sensor 101 based on detection data from the functions 116 and 117. The functions 116 and 117 include various elements according to the purpose of sensing. Various elements may be, for example, a camera and a microphone, as in the HGW 600. Further, various elements include a thermal sensor, a temperature sensor, a humidity sensor, an illumination sensor, a pressure sensor, a switch, etc. The sensor 101 may comprise one or more sensing elements according to the purpose of use.

The above sensors 101, 102, 103, . . . , etc., are arranged in various places at home, for example, as a sensor for detecting opening/closing of a door, a sensor for detecting the type of a sound of a certain level, a sensor for detecting movement of a person, a sensor for detecting opening/closing of a window, and a sensor for capturing an image.

In the above system, when a detection signal is output from one or more of the sensor 611 (camera), the element 613 (microphone), and the other sensors 101, 102, . . . , the control data management module 601 recognizes it as occurrence of an event. Then, the control data management module 601 controls the camera 611 via the recording management device 607. Thereby, the camera 611 not only transmits monitoring data which has been cached before the occurrence of the event (for example, 10 minutes before) to a storage medium via the recording management device 607 and the control data management module 601, but also continues transmitting monitoring data which has been captured for a certain period of time (for example, 3 minutes, 5 minutes, 10 minutes, 20 minutes, or 30 minutes). Together with this monitoring data, in the present system, event-related data when the above event was detected (also referred to as event attribute data) is transmitted to a storage medium 1010.

The event-related data can include one or more of, for example, the time when an event occurred, the type of sensor which detected the event, position data on the sensor, the recording start time, and the recording end time.

In FIG. 11, the storage medium is a memory within the server 1000, for example, but is not necessarily a storage medium within the server. A memory location of the monitoring data may be a storage medium within the HGW 600, or a storage medium connected via the network I/F 605. The storage medium 1010 comprises a data region 1011 and a management region 1021. In the data region 1011, monitoring data 1012 is stored, and in the management region 1021, event-related data 1022 is stored.

The monitoring data 1012 may include not only video data, but also measurement data from the sensors. The measurement data is, for example, a changing situation of a temperature, a changing situation of humidity, or a changing situation of pressure of a specific location. In the management region 1021, management data for reproducing the monitoring data is written. The management data includes the aforementioned event-related data. The management data includes the event-related data, and a recording address of the monitoring data corresponding to the event-related data. When a plurality of events occurred, a plurality of items of event-related data, and a plurality of items of monitoring data corresponding to the plurality of items of event-related data exist.

The event-related data includes the type of event (also referred to as sensor output). Also, while the monitoring data (for example, a monitoring image) is recorded based on the event, the event-related data includes the recording start time and the recording end time.

Figure 12:
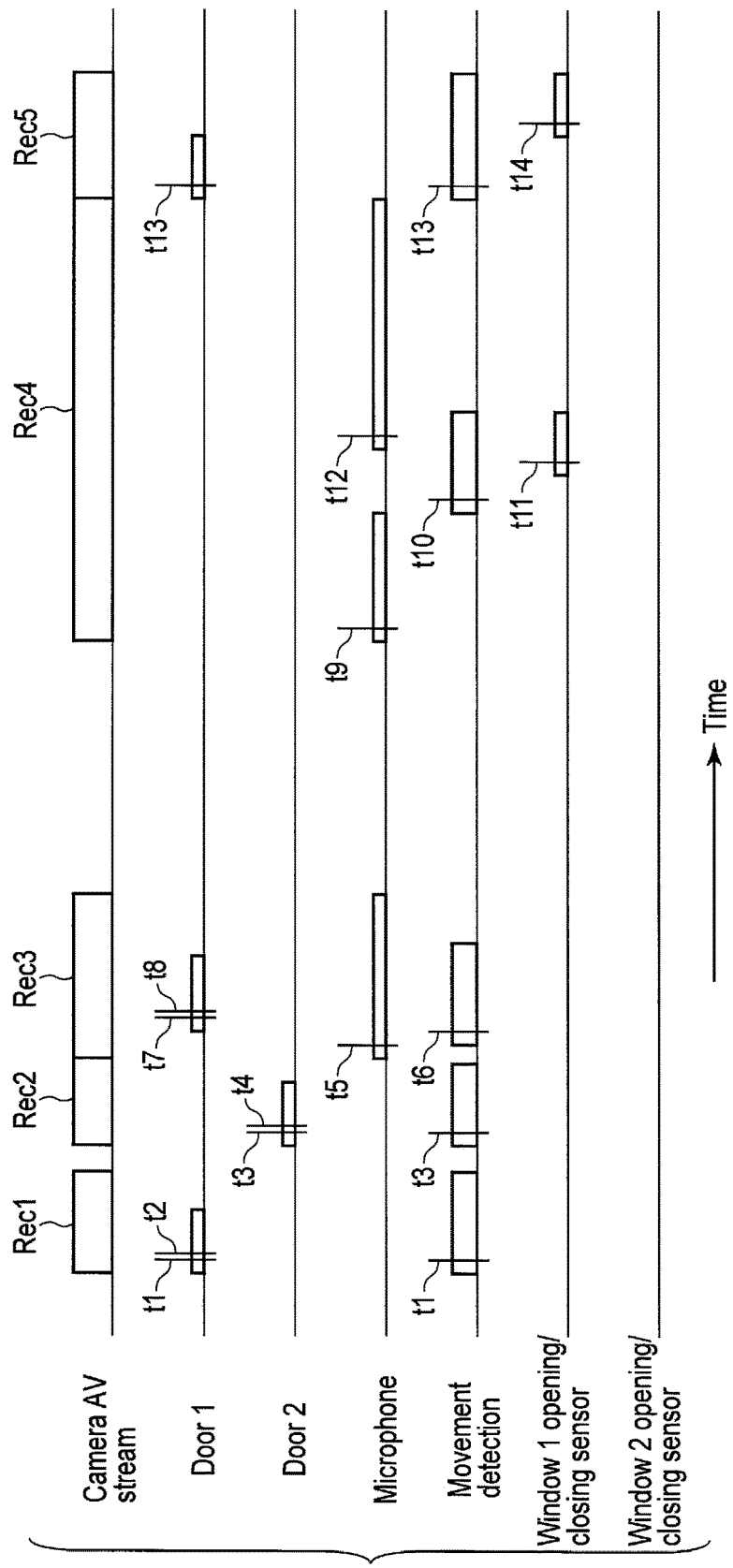
FIG. 12 is an explanatory diagram showing an example in which event-related data and a stream of monitoring data are recorded in the embodiment shown in FIG. 11 as a time line.

FIG. 12 shows a time course when the monitoring data is recorded on the storage medium when an event occurred. Here, various sensors in a living room of a home are assumed. As the sensors, it is assumed that an opening/closing detection sensor of a door 1, an opening/closing detection sensor of a door 2, an opening/closing detection sensor of a window 1, an opening/closing detection sensor of a window 2, a microphone, and a movement detection sensor (a captured image or infrared sensor or the like is used) exist. Also, it is assumed that the HGW 600 is arranged in a corner of a ceiling of the living room, and the camera of the HGW 600 can capture an image of the living room.

Now, it is assumed that child 1 entered the room from door 1, and door 1 is opened at time t1 and closed at time t2. At time t1, the camera detects movement of a person. When the door is opened or closed, recording for about 3 minutes, for example, is performed. When the movement detection continues, the recording is performed continuously for this detection period. During the time in which the recording is performed, a sound is picked up from the microphone 613. As a result, in the storage medium 1010 (or may be a storage medium within the HGW 600 or one which is directly connected to the HGW 600), monitoring data related to a first event (including two types of events) is recorded as recorded data Rec1. Also, as the event-related data at this time, an ID of a sensor arranged on door 1, an ID of the camera 611, and a start time and an end time of recording Rec1 are included. In addition, the management data (event-related data) includes an address of the storage medium in which recording Rec1 is stored.

After a while, it is assumed that child 2 entered the room from door 2, and door 2 is opened at time t3 and closed at time t4. Again, at time t3, the camera detects movement of a person. Monitoring data related to a second event (including two types of events) is recorded as recorded data Rec2 in the storage medium.

Next, it is assumed that a large noise is picked up by the microphone 613 at time t5, movement of a person is detected at time 6, and opening and closing of door 1 are detected at times t7 and t8. For example, it is assumed that child 2 sings a song in a loud voice, movement of child 2 is detected, and child 1 walks out of the room from door 1. Monitoring data related to a third event (including three types of events) is thereby recorded as recorded data Rec3 in the storage medium.

After some while, it is assumed that a large noise is picked up by the microphone 613 at time t9, movement of a person is detected at time 10 by the camera 611, window 1 is opened at time t11, and a large noise is picked up by the microphone 613 again at time t12. For example, it is assumed that child 2 sings a song in a loud voice, then child 2 moves to window 1, opens window 1, and sings a song in a loud voice again. Monitoring data related to a fourth event (including four types of events) is thereby recorded as recorded data Rec4 in the storage medium.

Next, it is assumed that child 1 entered the room from door 1 at time t13, and window 1 is closed at time t14. Monitoring data related to a fifth event (including two types of events) is thereby recorded as recorded data Rec5 in the storage medium.

As described above, when the event-related data and the monitoring data are recoded on the storage medium, in a case where the monitoring data is checked, the HGW 600 can present the monitoring data on the smartphone GUI-1 in various forms.

FIG. 13 shows an internal configuration example of the system controller 602 shown in FIG. 11.

Detection signals from the respective sensors as described referring to FIG. 12 are determined by an event determination device 6025. When an event is detected, a recording order device 6021 transmits the monitoring data 1012 to the storage medium 1010, and orders recording. Also, at the same time, the event-related data is transmitted to the storage medium 1010 and recorded.

When a specific command signal is transmitted from the smartphone GUI-1, the event determination device 6025 can make determination as an event. For example, when a first user having the smartphone GUI-1 is having a telephone conversation with a second user at home, the first user can operate a specific key of the smartphone GUI-1 and send an event activation signal to the HGW 600. Also, even when the first user is not having a conversation, the first user can operate the specific key of the smartphone GUI-1 and send an event activation signal to the HGW 600. Furthermore, the second user at home can deliberately operate the sensor and send an event activation signal to the HGW 600. For example, for the purpose of checking, the second user can deliberately operate a sensor which senses whether the illumination is turned on or off (by blocking or exposing a light-receiving portion, for example) to transmit the event activation signal to the HGW 600.

When the monitoring data is to be checked, the user can request the HGW 600 (the system controller 602) to reproduce the monitoring data related to a desired event via the smartphone GUI-1 or a television receiving apparatus GUI-2 connected to the Internet.

For this reason, the system controller 602 comprises a reproduction controller 6023 for reproducing arbitrary event-related data and monitoring data from a storage medium 1030. The reproduction controller 6023 includes a fast-forward function, a back-feed function, and a frame advance function, and furthermore, an event processing device which performs an integration process of an event. Also, since large amounts of event-related data and monitoring data are stored in the storage medium 10101, the system controller 602 can behave to allow the user to efficiently check the desired monitoring data. Thus, the system controller 602 comprises a filtering module 6031 which can sort various events, make a selection, and create a display list or display arrangement, and a display style processing module 6029. The created display arrangement and the reproduced monitoring data are transmitted to a monitor such as the smartphone GUI-1 or the television receiving apparatus GUI-2 through a display data output module 6027. Also, the system controller 602 includes a memory 6024 for temporarily saving the data or the list.

The system controller 602 and the smartphone GUI-1 or the television receiving apparatus GUI-2 communicate with each other, and the system controller 602 transmits the above created display arrangement and reproduced monitoring data to the monitor. Also, in response to an order from the smartphone GUI-1 or the television receiving apparatus GUI-2, the reproduction controller 6023 can execute a fast-forward function, a back-feed function, and a frame advance function of an image of an event which is being captured. Further, the reproduction controller 6023 includes an event processing device which processes the event-related data, and can execute processing such as determining the order of arrangement of the events, and selecting the event.

Figure 14:
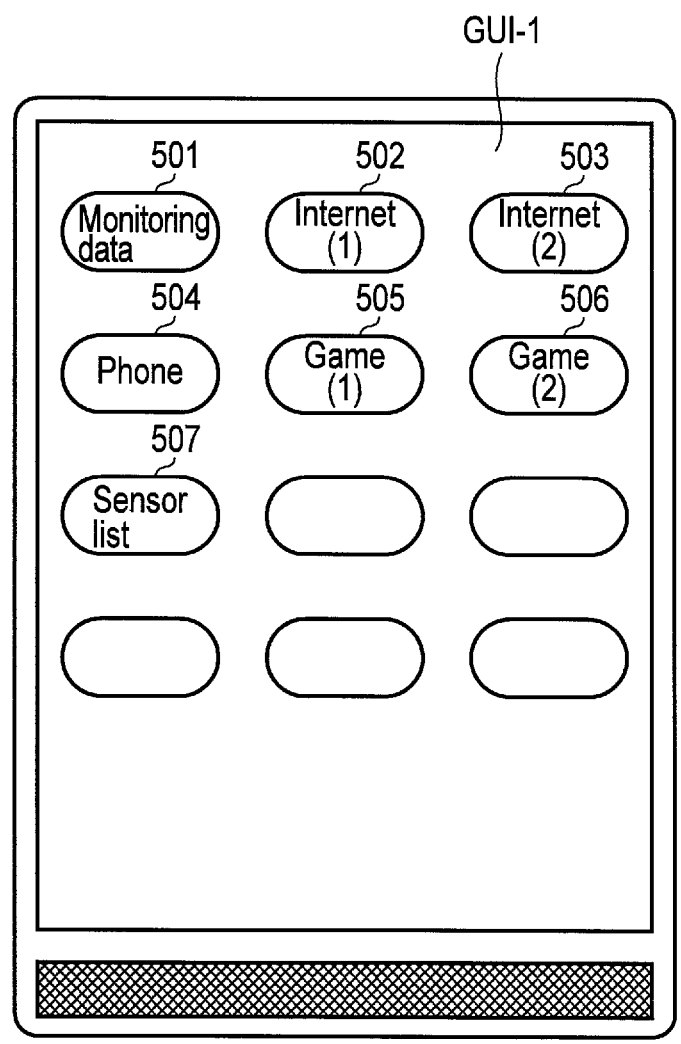
FIG. 14 is an illustration showing an example of a menu of a smartphone as a user interface capable of accessing the event-related data and/or monitoring data.

FIG. 14 shows the state in which a menu is displayed on a screen of the smartphone GUI-1, for example. As selection buttons within the menu, for example, a monitoring data request button 501, an Internet connection button (1) 502, an Internet connection button (2) 503, a phone starting button 504, a game start button (1) 505, a game start button (2) 506, etc., are provided. Also, the menu includes a sensor list button 507, and when this button 507 is operated, a list of various sensors for detecting an event can be displayed.

Here, it is assumed that the monitoring data request button 501 is touched and operated. Then, in the smartphone GUI-1, together with the message "What is the event whose image you want to check?", as shown in FIG. 15A or 15B, for example, buttons 512, 513, and 514 indicating "All", "To be specified", "Usual", are displayed to the user.

When the user selects button 512 indicating "All" by a touch operation, based on control by the control data management module 601, data on date and time that the events (all events not considering the type of the sensor) occurred, and a part (thumbnail) of the monitoring data (image data captured by the camera) at the time each of the events occurred are transmitted to the smartphone GUI-1. Since large amount of event-related data and monitoring data are stored in the storage medium 10101, as display data at the start of display, event-related data, which relates to (three to five) events which occurred at times before and after an event which occurred, for example, 5 hours ago from the present time, and representative thumbnails of the corresponding monitoring data are selected and displayed. The representative thumbnails are, for example, monitoring data (image data) corresponding to the time when the event occurred.

When a message "What is the event whose image you want to check?" is displayed on the smartphone GUI-1, the user can select button 513 indicating "To be specified" by a touch operation. When this button is selected, a list 517 of names of places where the activated sensors are arranged, for example, (Opening/closing of door 1, Opening/closing of door 2, Opening/closing of window 1, Opening/closing of window 2, ..., etc.) is displayed. The user can select one or more events which have occurred for which image checking is desired by a touch operation. FIG. 15A shows an example in which items representing opening/closing of door 1, opening/closing of window 1, movement detection, etc., are selected and determined. In this example, although a simple example of the events is displayed, in reality, many more events and the names of the events are set.

When the user selects an event which has occurred for which image checking is desired and performs a determination operation 518 to confirm this selection, as indicated later, a representative thumbnail of the monitoring data at the time when the selected event occurred and the corresponding event-related data are displayed. Also in this case, since large amounts of event-related data and monitoring data are stored in the storage medium 10101, as display data at the start of display, event-related data, which relates to (three to five) events which occurred at times before and after an event which occurred, for example, 5 hours ago from the present time, and representative thumbnails of the corresponding monitoring data are selected and displayed.

When a message "What is the event whose image you want to check?" is displayed on the smartphone GUI-1, the user can select button 514 indicating "Usual" by a touch operation. This button 514 becomes effective once button 513 indicating "To be specified" has been operated, and the determination operation 518 has been performed. In this case, based on the event which has already been specified, event-related data, which relates to (three to five) events which occurred at times before and after an event which occurred, for example, 5 hours ago from the present time, and representative thumbnails of the corresponding monitoring data are selected and displayed.

FIG. 15A describes an example in which events are managed independently according to the selected type, and items of the event-related data are arranged in order of time. The arrangement example will be described later in FIG. 18A. However, the display example of the event-related data is not limited to this. That is, by the setting as shown in FIG. 15B, items of event-related data on events of different types can be combined and displayed.

That is, as shown in FIG. 15B, before operating a determination button 518*b*, a combination button 518*a* may be displayed. When the combination button 518*a* is operated, it is possible to make the setting so that event-related data of the selected items in the event list (in the illustrated example, opening/closing of door 2 and audio detection) are combined in order of time and displayed. That is, when the combination button 518*a* and the determination button 518*b* are continuously operated, the arrangement and display of the event-related data which will be explained later referring to FIG. 18B, for example, are performed.

As described above, prior to requesting the control data management module 601 to reproduce the monitoring data related to a desired event, the user can notify the control data management module 601 what event is to chosen for the image reproduction.

FIG. 16A shows the operation screen which is displayed after the monitoring data request button 501 is operated in the menu of the smartphone GUI-1 shown in FIG. 14. Here, as described above, together with a message "What is the event whose image you want to check?", buttons 512, 513, and 514 such as "All", "To be specified", and "Usual" are displayed to the user. Here, it is assumed that button 514 indicating "Usual" is selected, for example. Then, an event list as shown in FIG. 16B, for example, is displayed. This event list is created by the display style processing module 6029 as the reproduction controller 6023 shown in FIG. 13 reads the event-related data and the monitoring data from the storage medium 1030, and a filter process is performed by the filtering module 6031. Note that the filtering may determine the order in which the reproduction controller 6023 reads the event-related data from the storage medium 1010, performs a filter process for the event-related data, and reproduces the monitoring data corresponding to the extracted event-related data from the storage medium 1010.

The above description applies to a case where the smartphone GUI-1 requests the event list and the event list is displayed, but a similar operation can be performed by the television receiving apparatus GUI-2 as well. Note that when an operation is performed by the television receiving apparatus GUI-2, the operation can be realized by a cursor on the screen via a remote controller.

Also, in FIG. 16B, although the thumbnails of the monitoring data are simplified in the illustration, in reality, an image of a viewing angle range of the camera 611 is captured.

Now, it is assumed that a thumbnail 522 of an event 521 is selected by a touch operation from the list of FIG. 16B. Then, reproduction of the monitoring data, which continues for about 10 minutes or so, captured from, for example, 5 minutes before the point when the event 521 occurred is started by the reproduction controller 6023 (FIG. 13), and the data is transmitted to the monitor. The image at this time is shown in FIG. 17.

Figure 17:
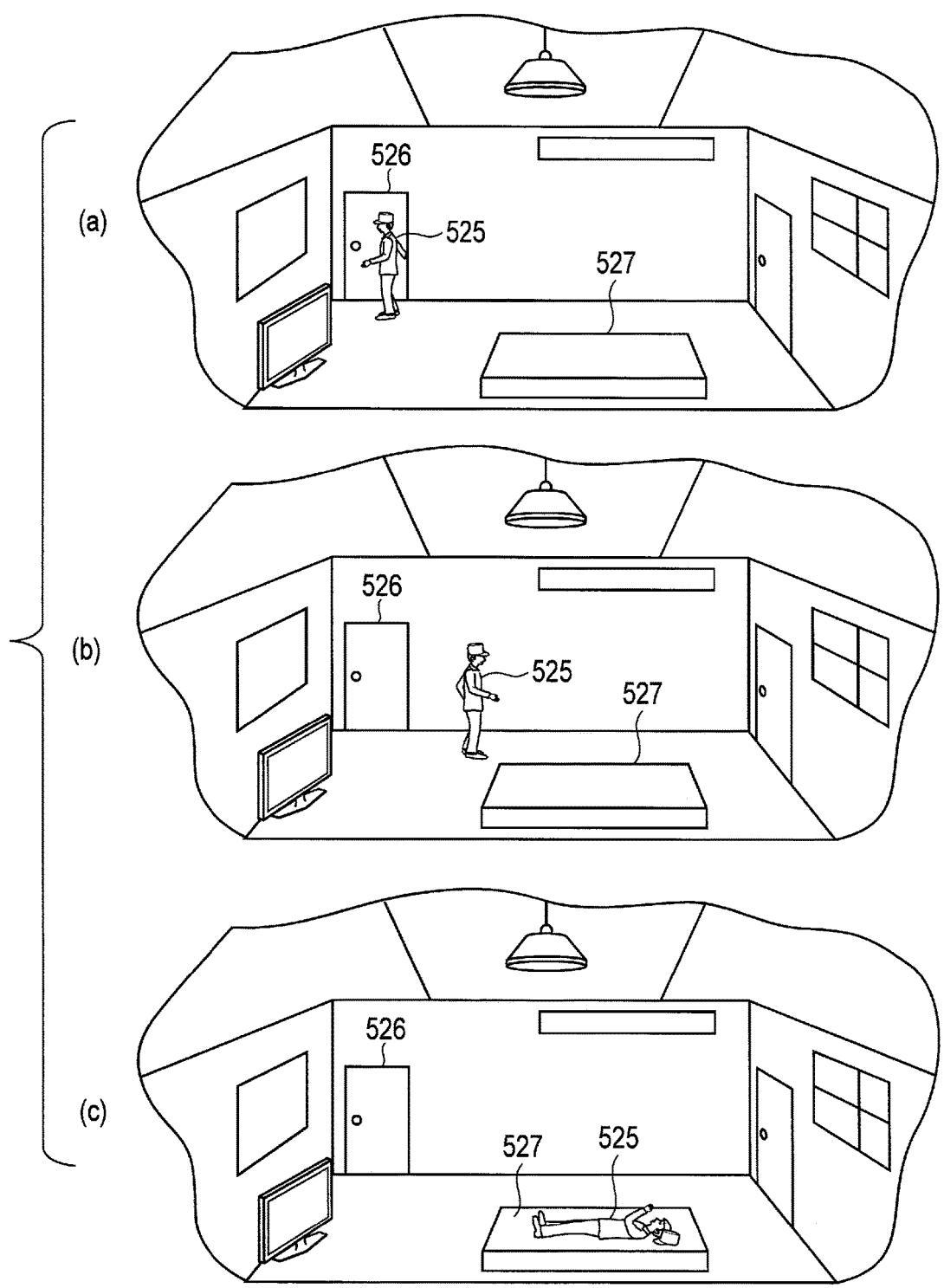
FIG. 17 is an illustration showing examples of images when the monitoring data (video data) regarding a certain event is reproduced.

As the image of FIG. 17, a state in which a person 525 opens a door 526 and enters the room, walks to a bed 527, and lies on the bed 527 and went to sleep is captured. In response to an order from the smartphone GUI-1 or the television receiving apparatus GUI-2, the reproduction controller 6023 displays a list of a plurality of items of monitoring data corresponding to a plurality of items event-related data, and when an arbitrary monitoring data is selected from among the items of monitoring data displayed in the list, the reproduction controller 6023 continuously reproduces the specified monitoring data for the recorded period.

Also, in response to an order from the smartphone GUI-1 or the television receiving apparatus GUI-2, the reproduction controller 6023 (FIG. 13) can execute a fast-forward function, a back-feed function, and a frame advance function of an image of an event which is being captured as described below.

Further, since the reproduction controller 6023 can refer to the event-related data, the items of monitoring data associated with the events can be fast-forwarded in reproduction or reproduced normally in succession one after another.

Furthermore, the reproduction controller 6023 can reproduce items of monitoring data associated with a specified particular event in a fast-forwarded way or normally in succession one after another.

Also, the reproduction controller 6023 shown in FIG. 13 includes an event processing device which processes items of event-related data, and the event processing device can gather and integrate the items of event-related data corresponding to the particular event. For example, the event may occur in a pulsewise manner. For example, detection of a large noise or detection of movement (for example, movement detected when a blind is swung by a wind) occurs sporadically. In such a case, it may be better to perform an integration process assuming the detection period as a continuous flow, and check the monitoring data based on the event-related information subjected to the integration process.

In the above embodiment, image data of a certain length of time (5 minutes, 10 minutes, 15 minutes or 20 minutes) which has been captured by the camera 611 at the time of detecting an event was saved as monitoring data. Here, the length of time that the monitoring data is saved for each event may be changeable arbitrarily. Further, the time period may be different according to the type of event. Furthermore, the length of time that the monitoring data is saved may be different according to a time frame.

The way in which the event is arranged (i.e., the way in which the event-related data and the corresponding thumbnails are arranged) is not limited, and the events can be arranged freely depending on an arrangement application. That is, the event-related data and the corresponding thumbnails can be displayed according to the arrangement.

Figure 18A:
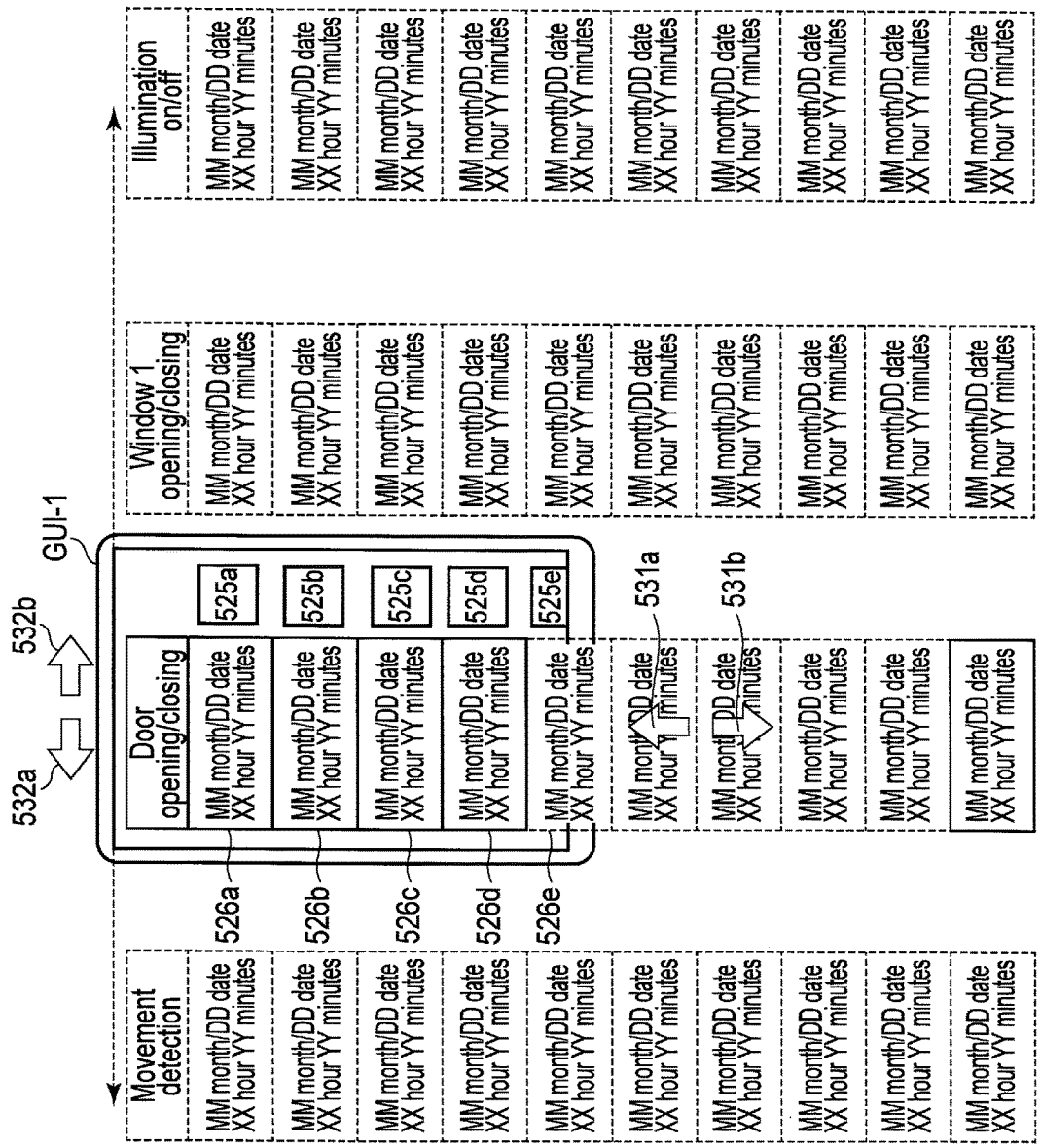
FIG. 18A is an illustration for describing an example of the relationship between a smartphone and event-related data displayed on the smartphone, and an operation method.

FIG. 18A shows a display example of a case where items of the event-related data and the thumbnails of the monitoring data associated with the event-related data are classified by the event. The event related to movement detection, the event related to opening/closing of door 1, the event related to opening/closing of window 1, and the event related to on/off of illumination 1 are illustrated as an example of the classification.

Now, on the smartphone GUI-1, event-related data 526*a* to 526*d* related to opening and closing of door 1 and the corresponding thumbnails 525*a* to 525*d* are indicated. Event-related data 526*a* to 526*d* are arranged in the order of time of occurrence of the event. Here, when the user swipes the touch operation surface of the smartphone GUI-1 in the direction of arrow 531*a*, the event-related data and the corresponding thumbnail at a later time are displayed, and when the touch operation surface is swiped in the direction of arrow 531*b*, the event-related data and the corresponding thumbnail at an earlier time are displayed.

Also, when the user swipes the touch operation surface of the smartphone GUI-1 in the direction of arrow 532*a*, the event-related data and the corresponding thumbnails regarding opening and closing of window 1 are displayed, and when the touch operation surface is swiped in the direction of arrow 532*b*, the event-related data and the corresponding thumbnails regarding movement detection are displayed.

Figure 18B:
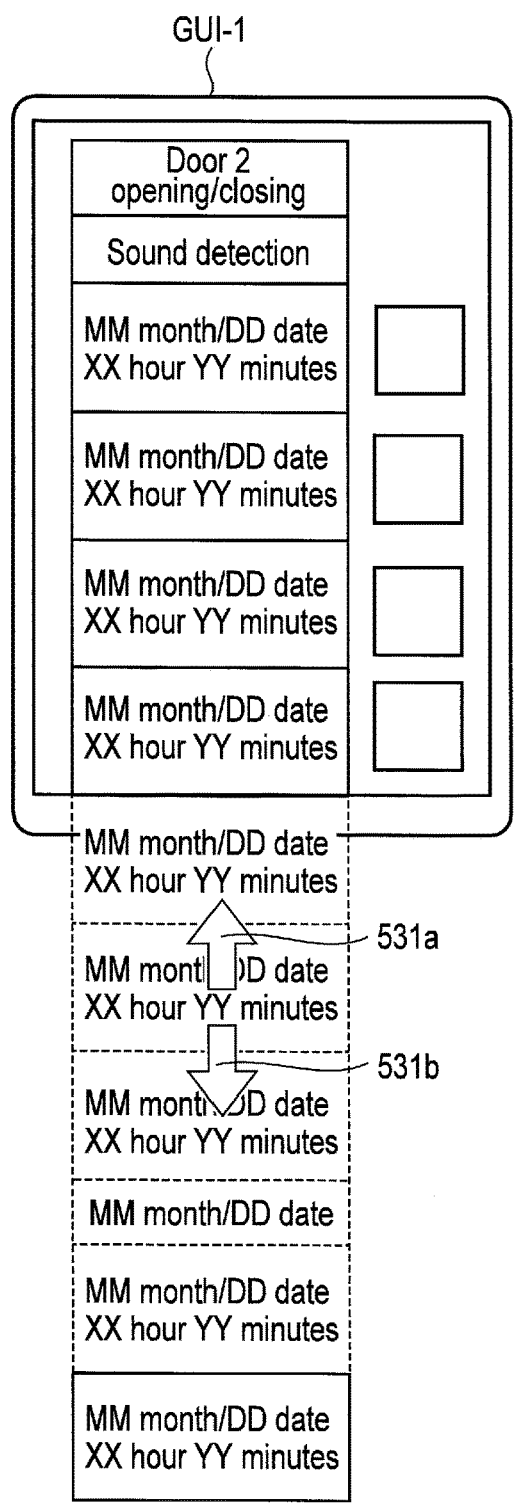
FIG. 18B is an illustration for describing an example of another relationship between a smartphone and event-related data displayed on the smartphone, and another operation method.

In the above embodiment, as described referring to FIGS. 13 and 15B, when the event-related data and the corresponding thumbnail are displayed, they can be displayed by combining a plurality of events. As shown in FIG. 13, the control data management module 601 includes the filtering module 6031. By the filtering module 6031, it is possible to filter and classify the event-related data according to the type of event, and list up and display the event-related data by combining items of event-related data on events of different types. FIG. 18B shows an example in which the event-related data and the thumbnails of the corresponding monitoring data are displayed when an event related to opening/closing of door 2 occurred and an event related to sound detection occurred.

Also in this case, when the user swipes the touch operation surface of the smartphone GUI-1 in the direction of arrow 531a, the event-related data and the corresponding thumbnail at a later time are displayed, and when the touch operation surface is swiped in the direction of arrow 531b, the event-related data and the corresponding thumbnail at an earlier time are displayed.

FIG. 19 is an illustration for describing an example of another relationship between the smartphone and the event-related data displayed on the smartphone, and another method of operation. In the previous display examples (FIGS. 18A to 18B), a list of event-related data is displayed. However, after the display of monitoring data is specified, the occurrence source names of the respective events may be displayed in the style of tiles as shown in FIG. 19. From among these tiles (Door 1, Door 2, Window 1 to Window 4, Illuminations 1 to 5, Sound 561, Sound-Female 562, Sound-Male 563, . . . , etc.), when the user pressed a desired tile (box), the display may be transferred to a state as shown in FIG. 16B, for example. When the box 561 indicated as "Sound" is selected, the event-related data regarding all sounds is to be displayed. However, when the box 562 indicated as "Sound-Female" is selected, the event-related data regarding a sound of a female is to be displayed, and when the box 563 indicated as "Sound-Male" is selected, the event-related data regarding a sound of a male is to be displayed.

FIG. 20 shows the structure of the event-related data recorded in the management region 1021, and the monitoring data recorded in the data region 1011. The event-related data is classified by the type of event occurred. For example, the events are opening and closing of the door, opening and closing of the window, on/off of the illumination, on/off of the air conditioner, on/off of the television receiving apparatus, movement detection, etc. Sensor items (Sensor 1, Sensor 2, . . . , etc.) to which the sensor identification number is added belong to various kinds of items. Further, event data is written to each sensor item. In the event data, for example, the time when the event occurred, the recording start time of the monitoring data, the recording end time of the monitoring data, a recording start address of the monitoring data, a recording end address of the monitoring data, and a thumbnail address are written. Since the recording start address of the monitoring data, the recording end address of the monitoring data, and the thumbnail address represent addresses in the data region 1011, the reproduction controller 6023 can refer to the addresses and read and reproduce necessary data from the storage medium 1030.

In the present embodiment, the monitoring data can easily be displayed at high quality in the television receiving apparatus GUI-2, for example. Also, since the monitoring data is not transmitted to the outside via the Internet 300, it is particularly effective when personal monitoring data is managed. A concealment process is performed for data transmitted to the server 1000 via the Internet 300, or data transmitted to the HGW from the server 1000.

About the above-mentioned technical term, various expressions are possible. As for the above-mentioned technical term, those names are not necessarily limited. For example, you may exchange device (or unit) for unit (or device).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A mobile assist device comprising:
   a movable device;
   a sensor mounted on the movable device;
   a control module which determines brightness of surroundings from an output of the sensor, and also outputs a control signal for controlling an operation of another instrument based on a result of the determination, the control module comprises a human sensor, and when the human sensor detects a person, adjustment of an illumination intensity of an illuminator is stopped; and
   a mapping module which stores a plurality of areas, wherein:
      the control module determines a moving destination area of the plurality of areas,
      in the determined moving destination area, the illumination intensity is measured, and
      if a measured value of the illumination intensity is less than a predetermined value, the illumination intensity of the illuminator in the determined moving destination area is adjusted.

2. The mobile assist device of claim 1, further comprising a camera, wherein when the illumination intensity of the illuminator in the determined moving destination area is adjusted, an image is captured by the camera.

3. The mobile assist device of claim 1, wherein when the human sensor detects a person, a microphone or a speaker is activated.

4. The mobile assist device of claim 1, further comprising a camera, wherein:
   when the measured value of the illumination intensity is less than the predetermined value, the control module temporarily stores the measured value of the illumination intensity;
   when the illumination intensity of the illuminator in the determined moving destination area is adjusted, an image is captured by the camera; and
   after capturing the image by the camera, the illuminator is adjusted so that the illumination reaches a level corresponding to the measured value temporarily stored.

5. The mobile assist device of claim 4, wherein the control unit also stores color of illumination before the illumination intensity of the illuminator is adjusted, and after the image is captured by the camera, the color of the illumination of the illuminator is returned to that before the adjustment.

* * * * *